(12) United States Patent
Tulino et al.

(10) Patent No.: US 8,867,984 B2
(45) Date of Patent: Oct. 21, 2014

(54) INTERFERENCE COORDINATION FOR COMMUNICATION NETWORK

(75) Inventors: Antonia M. Tulino, Lincroft, NJ (US); Gerard J. Foschini, South Amboy, NJ (US); Reinaldo A. Valenzuela, Holmdel, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 469 days.

(21) Appl. No.: 13/009,330

(22) Filed: Jan. 19, 2011

(65) Prior Publication Data
US 2012/0184203 A1    Jul. 19, 2012

(51) Int. Cl.
*H04B 3/36*    (2006.01)
*H04W 52/24*   (2009.01)

(52) U.S. Cl.
CPC .................................. *H04W 52/244* (2013.01)
USPC ............ 455/7; 455/63.1; 455/67.13; 455/501

(58) Field of Classification Search
CPC .......... H04W 72/042; H04W 72/1278; H04W 24/10; H04W 72/04; H04W 72/1257; H04W 72/085; H04L 5/0053; H04L 5/0037; H04L 1/0027; H04L 5/0094; H04L 1/0015
USPC ........ 455/7, 11.1, 13.1, 501, 424, 436, 422.1, 455/446, 63.1, 509, 69, 522; 370/315, 329, 370/253, 400, 226, 254, 328, 312, 330
See application file for complete search history.

(56) References Cited

U.S. PATENT DOCUMENTS

| 2004/0171401 A1* | 9/2004 | Balachandran et al. | 455/522 |
|---|---|---|---|
| 2009/0059962 A1* | 3/2009 | Schmidt et al. | 370/503 |
| 2009/0262676 A1* | 10/2009 | Labbe et al. | 370/312 |
| 2010/0074230 A1* | 3/2010 | Ishii et al. | 370/336 |
| 2010/0272009 A1* | 10/2010 | Cheng et al. | 370/315 |

OTHER PUBLICATIONS

"Overview for Ultra Mobile Broadband (UMB) Air Interface Specification," 3rd Generation Partnership Project 2 (3GPP2), C.P0084-000-0, Apr. 2007, 42 pages, Version 1.0.

E. Altman et al., "Closed Form Solutions for Water-Filling Problems in Optimization and Game Frameworks," Proceedings of the 2nd International Conference on Performance Evaluation Methodologies and Tools, Valuetools, Oct. 2007, 8 pages, Nantes, France.

(Continued)

*Primary Examiner* — Golam Sorowar
(74) *Attorney, Agent, or Firm* — Ryan, Mason & Lewis, LLP

(57) ABSTRACT

Techniques are disclosed for interference coordination in communication networks. For example, a method comprises the following steps. Input information is obtained from a communication network. The input information comprises existing power levels associated with transmitting nodes in the communication network, and existing channel information associated with receiving nodes in the communication network. A coordinated resource set of future transmitting times and future power levels associated with the transmitting nodes and future decoding times associated with the receiving nodes that reduce interference in the communication network is determined. The coordinated resource set determination comprises evaluating a cost function for a given range of interference values based on at least a portion of the input information. In a downlink scenario, the transmitting nodes may comprise base stations and relays, and the receiving nodes may comprise user equipment. The method may also be applied to an uplink scenario.

22 Claims, 15 Drawing Sheets

(56) References Cited

OTHER PUBLICATIONS

E. Altman et al., "A Survey on Networking Games in Telecommunications," Elsevier, Computers & Operations Research, Feb. 2006, pp. 286-311, vol. 33, No. 2.

A.L. Stolyar et al., "Self-Organizing Dynamic Fractional Frequency Reuse for Best-Effort Traffic Through Distributed Inter-Cell Coordination," IEEE INFOCOM, Apr. 2009, pp. 1287-1295, Rio de Janeiro, Brazil.

K. Azarian et al., "On the Achievable Diversity Multiplexing Tradeoff in Half-Duplex Cooperative Channels," IEEE Transactions on Information Theory, Dec. 2005, pp. 4152-4172, vol. 51, No. 12.

A. Ben-Tal et al., "Global Minimization by Reducing the Duality Gap," Journal of Mathematical Programming: Series A and B, Jan. 1994, pp. 193-212, vol. 63, No. 2.

T. Bonald et al., "Inter-Cell Scheduling in Wireless Data Networks," European Wireless Conference, Apr. 2005, 7 pages, Nicosia, Greece.

S. Boyd et al., "Branch and Bound Methods," Notes for the EE392o, Stanford University, Nov. 2003, 11 pages.

S.T. Chung et al., "A Game-Theoretic Approach to Power Allocation in Frequency-Selective Gaussian Interference Channels," IEEE International Symposium on Information Theory (ISIT), Jun.-Jul. 2003, p. 316, Yokohama, Japan.

S. Das et al., "Interference Mitigation Through Interference Avoidance," 40th Asilomar Conference on Signals, Systems and Computers, Oct.-Nov. 2006, pp. 1815-1819.

S. Das et al., "Dynamic Load Balancing Through Coordinated Scheduling in Packet Data Systems," 22nd Annual Joint Conference of the IEEE Computer and Communications, INFOCOM, Mar.-Apr. 2003, pp. 786-796, vol. 1.

R. Etkin et al., "Spectrum Sharing for Unlicensed Bands," IEEE Journal on Selected Areas in Communications, Apr. 2007, pp. 517-528, vol. 25, No. 3.

A. Gjendemsjo et al., "Optimal Power Allocation and Scheduling for Two-Cell Capacity Maximization," 4th International Symposium on Modeling and Optimization in Mobile, Ad Hoc and Wireless Networks, Apr. 2006, 6 pages.

H. Huang et al., "Increasing Downlink Cellular Throughput with Limited Network MIMO Coordination," IEEE Transactions on Wireless Communications, Jun. 2009, pp. 2983-2989, vol. 8, No. 6.

E.L. Lawler et al., "Branch-and-Bound Methods: A Survey," Operations Research, Jul.-Aug. 1966, pp. 699-719, vol. 14, No. 4.

Ramon E. Moore, "Global Optimization to Prescribed Accuracy," Computers and Mathematics with Applications, 1991, pp. 25-39, vol. 21, No. 6/7.

Hoang Tuy, "On a Decompization Method for Nonconvex Global Optimization," Journal of Mathematics and Statistics, Optimization Letters, Jun. 2007, pp. 245-258, vol. 1, No. 3.

B. Wang et al., "On the Capacity of MIMO Relay Channels," IEEE Transactions on Information Theory, Jan. 2005, pp. 29-43, vol. 51, No. 1.

Q. Zhang et al., "Hybrid ARQ with Selective Combining for Fading Channels," IEEE Journal on Selected Areas in Communications, May 1999, pp. 867-880, vol. 17, No. 5.

Z. Zhang et al., "Capacity Approach Codes for Relay Channels," International Symposium on Information Theory (ISIT), Jun.-Jul. 2004, p. 2.

B. Zhao et al., "Practical Relay Networks: A Generalization of Hybrid-ARQ," IEEE Journal on Selected Areas in Communications, Jan. 2005, pp. 7-18, vol. 23, No. 1.

\* cited by examiner

INTERFERENCE COORDINATION FOR COMMUNICATION NETWORK

FIELD OF THE INVENTION

The present invention relates generally to communication networks and, more particularly, to techniques for interference coordination in such communication networks.

BACKGROUND OF THE INVENTION

It is known that, in order to meet the demand for higher bit rates offered by wireless communication networks, the wireless communication industry is developing an enhanced version of the Long Term Evolution (LTE) standard known as LTE-Advanced. LTE-Advanced is a preliminary mobile (cellular) communication standard, which was submitted as a candidate Fourth Generation (4G) system to the Telecommunications Standardization Sector (ITU-T) in late 2009, and which is expected to be finalized in 2011. As is also known, the ITU-T manages standards for telecommunications on behalf of the International Telecommunication Union (ITU). Also, LTE-Advanced is standardized by the 3rd Generation Partnership Project (3GPP) as an enhancement of the 3GPP LTE standard.

It is also known that relay nodes are being evaluated as a possible technology to meet the needs for improved coverage, throughput and edge rates in LTE-Advanced networks. A relay node is a Wireless transceiver that can be used to relay a message between a base station node and a user terminal node to improve the performance of the direct link.

A challenge in relay deployment is to favorably trade off performance gains in the links improved with relays against performance losses from the interference caused in neighboring links.

SUMMARY OF THE INVENTION

Embodiments of the invention provide techniques for interference coordination in communication networks.

For example, in one aspect, a method comprises the following steps. Input information is obtained from a communication network. The input information comprises existing power levels associated with transmitting nodes in the communication network, and existing channel information associated with receiving nodes in the communication network. A coordinated resource set of future transmitting times and future power levels associated with the transmitting nodes and future decoding times associated with the receiving nodes that reduce interference in the communication network is determined. The coordinated resource set determination comprises evaluating a cost function for a given range of interference values based on at least a portion of the input information. The method may also comprise causing the implementation of the coordinated resource set in the communication network.

The transmitting nodes may comprise base stations in the communication network, and in this case, the receiving nodes comprise user equipment in the communication network. Further, relays in the communication network may be transmitting nodes and/or receiving nodes, depending on the communication path or scenario. User equipment can also be transmitting nodes.

Further, the coordinated resource set determining step may comprise evaluating the range of interference values with respect to the receiving nodes and splitting the range up into two or more subsets.

In addition, the coordinated resource set determining step comprises performing a bounding process by evaluating, for each of the two or more subsets into which the range is split, an upper bound and a lower bound of the cost function. For the bounding process, the upper bound and the lower bound of the cost function are evaluated in terms of the power levels, the transmitting times, and the decoding times.

Still further, the coordinated resource set determining step comprises performing a branching process by selecting the subset of the two or more subsets with a minimum value for the lower bound. For the branching process, the selected subset is split into two or more further subsets based on a given subdivision rule.

Also, the coordinated resource set determining step further comprises determining whether or not a difference between the upper bound and the lower bound is smaller than a given precision measure. The power levels, the transmitting times, and the decoding times associated with the selected subset are identified as the coordinated resource set of future transmitting times and future power levels associated with the transmitting nodes and future decoding times associated with the receiving nodes that reduce interference in the communication network, when the difference between the upper bound and the lower bound is determined to be smaller than the given precision measure. When the difference between the upper bound and the lower bound is determined not to be smaller than the given precision measure, the bounding process and branching process are repeated for a new set of interference values, transmitting times and decoding times.

In one embodiment, the coordinated resource set is determined for a downlink, and in another embodiment, the coordinated resource set is determined for an uplink.

Advantageously, interference in the communication network is coordinated by optimizing resource allocation, i.e., by determining a coordinated resource set that reduces interference in the communication network. In a communication network that is relay-assisted, i.e., includes deployment of one or more relays, principles of the invention permit determination of a favorable trade off between performance gains in the links improved with relays against performance losses from the interference caused in neighboring links.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
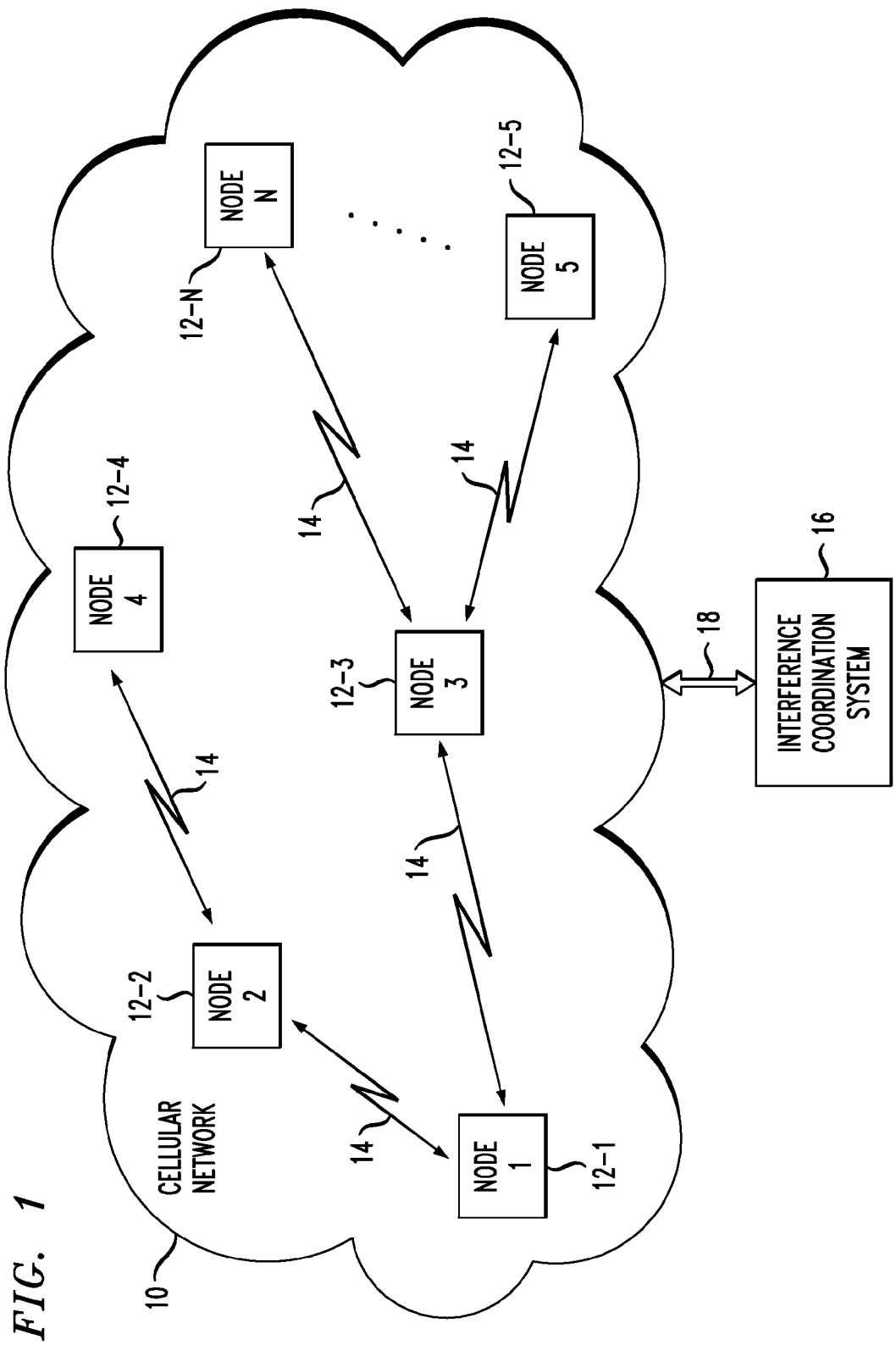
FIG. 1 is a block diagram illustrating an interference coordination system in conjunction with a communication network according to an embodiment of the invention.

The following description will illustrate the invention in the context of an exemplary cellular network environment associated with the LTE-Advanced standard. It should be understood, however, that while principles of the invention are particularly suitable to such a cellular network environment, the invention is not limited to use with such an environment. That is, principles of the invention are generally applicable to any suitable communication environment in which it would be desirable to provide improved interference coordination.

As will be explained in illustrative detail herein, principles of the invention provide techniques for identifying a class of cooperative transmission protocols for communication channels and optimizing them in terms of resource allocations, in order to achieve interference coordination. While illustrative embodiments will be described in the context of a cellular network that employs relay nodes (i.e., a relay-assisted cellular network), it is to be understood that principles of the invention are not limited to use in relay-assisted cellular networks. Nonetheless, it will be evident that the inventive interference coordination techniques, along with the presence of relays, are a particularly effective approach to improving network performance. Indeed, results have shown that the inventive approach significantly improves edge rate (specified outage) and/or average rate, among other advantages.

Advantageously, the interference coordination techniques, as will be described herein in the context of one or more illustrative embodiments, yield an interference coordination approach for a relay-assisted cellular network where a joint optimal (in the sense of maximizing a suitable performance measure) resource allotment, in terms of fractional transmission time of all mutually interfering transmitting nodes, and in terms of the power allocations for transmissions at the transmitting interfering nodes. Note here that transmitting nodes or terminals are either "sources" or relays. It is to be understood that in the downlink scenario, sources are sectors of the base station, or the entire base station (when not divided into multiple sectors). As such, in the downlink scenario, "destinations" are considered the mobile terminals, i.e., user equipment or terminals (receiving nodes or terminals). However, relays can be receiving nodes as well.

Furthermore, one main advantage of the inventive interference coordination approach over existing interference coordination solutions is that the inventive interference coordination approach admits new transmission-protocol solutions much more flexible and general than previous interference coordination methods since the inventive interference coordination approach introduces, for the destinations whose corresponding sources mutually interfere, the additional flexibility of different decoding times. Still further, differently from any other existing interference coordination technique, the interference coordination according to embodiments of the invention is performed taking jointly into account the presence of interfering base stations and interfering relays. This allows further gains especially in terms of edge rate.

FIG. 1 is a block diagram illustrating an interference coordination system in conjunction with a communication network according to an embodiment of the invention. As shown, a cellular communication network 10 comprises a plurality of communication nodes 12-1 through 12-N. One or more communication nodes 12 are shown being in communication with one or more other communication nodes 12 via wireless links 14. The specific interconnectivity of the nodes 12 shown in FIG. 1 is for illustration purposes only.

In one embodiment, cellular network 10 may be configured to operate in accordance with the LTE-Advanced standard. In such case, one or more of the communication nodes 12 are base station nodes, one or more of the communication nodes 12 are user terminal nodes, and one or more of the communication nodes 12 are relay nodes. It is to be understood that each communication node 12 is capable of acting as a transmitting terminal (transmitting node, transmitter) and a receiving terminal (receiving node, receiver). That is, each node 12 may be a transceiver. Thus, when it is explained herein that the interference coordination techniques of the invention take into account the number of transmitting terminals, it is to be understood that can include, based on the specific scenario, one or more types of communication nodes, e.g., base stations alone, relays alone, or any combinations thereof. Analogously, the receiving terminals, based on the specific scenario, can include one or more types of communications nodes, e.g., relays alone, user terminals alone, or any combinations thereof.

While illustrative embodiments herein will be described from the perspective of the downlink in the LTE-Advanced network, i.e., communication flow from base stations and/or relays to user terminals, one of ordinary skill in the art will appreciate how interference coordination techniques of the invention can be applied to the uplink perspective, i.e., communication flow from a user terminal to base stations and/or relays, in a straightforward manner.

Referring back to FIG. 1, interference coordination system 16 is shown coupled to the cellular network 10 via a communication link 18. It is to be understood that interference coordination system 16 executes the interference coordination techniques of the invention described herein. That is, the system 16 receives input information from the cellular network 10 via the communication link 18. In particular, input information is received by the system 16 from at least a portion of the communication nodes 12. From nodes 12 that are acting as transmitting terminals, the system 16 receives the transmitting power levels of the transmitting terminals. From nodes 12 that are acting as receiving terminals, the system 16 receives channel information (e.g., amplitude-link and phase link estimated at the receiving terminals). The system 16 also receives as input information from the cellular network 10 the number of nodes 12 actively acting as transmitting terminals.

Based on the input information, the interference coordination system 16 performs an interference coordination methodology according to an embodiment of the invention and computes optimal resource allocations based on one or more given cost functions as well as other parameters. The optimized resource allocations are sent back from the system to the appropriate communication nodes 12, e.g., mainly to the nodes acting as transmitting terminals but also to nodes acting as receiving terminals, when appropriate, depending on the chosen transmitting strategy.

It is to be understood that the term "resource" as used herein is intended to refer to one or more operational parameters associated with a communication node in the subject network. By way of example, in the context of the illustrative embodiments described herein, the resources can include transmitting power level, and transmitting times (for transmitting terminals) and decoding times (for receiving terminals). Here "power level" illustratively refers to the level of average transmitting power, more particularly, the temporal average transmitting power over the channel use. "Transmitting times" indicate the instants (different for each transmitting node) when the transmitting nodes begin to transmit. "Decoding times" indicate the instants (different for each destination) when the destinations decode the message sent by their corresponding transmitting nodes. The decoding times (different for each destination) can be also seen as the instant when the corresponding transmitting nodes stop to send information to the destinations. The decoding and the transmitting times should optimize jointly between the several interfering channels (i.e., pairs of transmitting (source/relay) nodes and destinations) since a good optimization and a suitable choice of their values will reduce the interference.

Note also that the communication link 18 may be wireless, wired, or a combination thereof, depending on the types of network nodes from which the system receives information and to which the system sends information.

Figure 2:
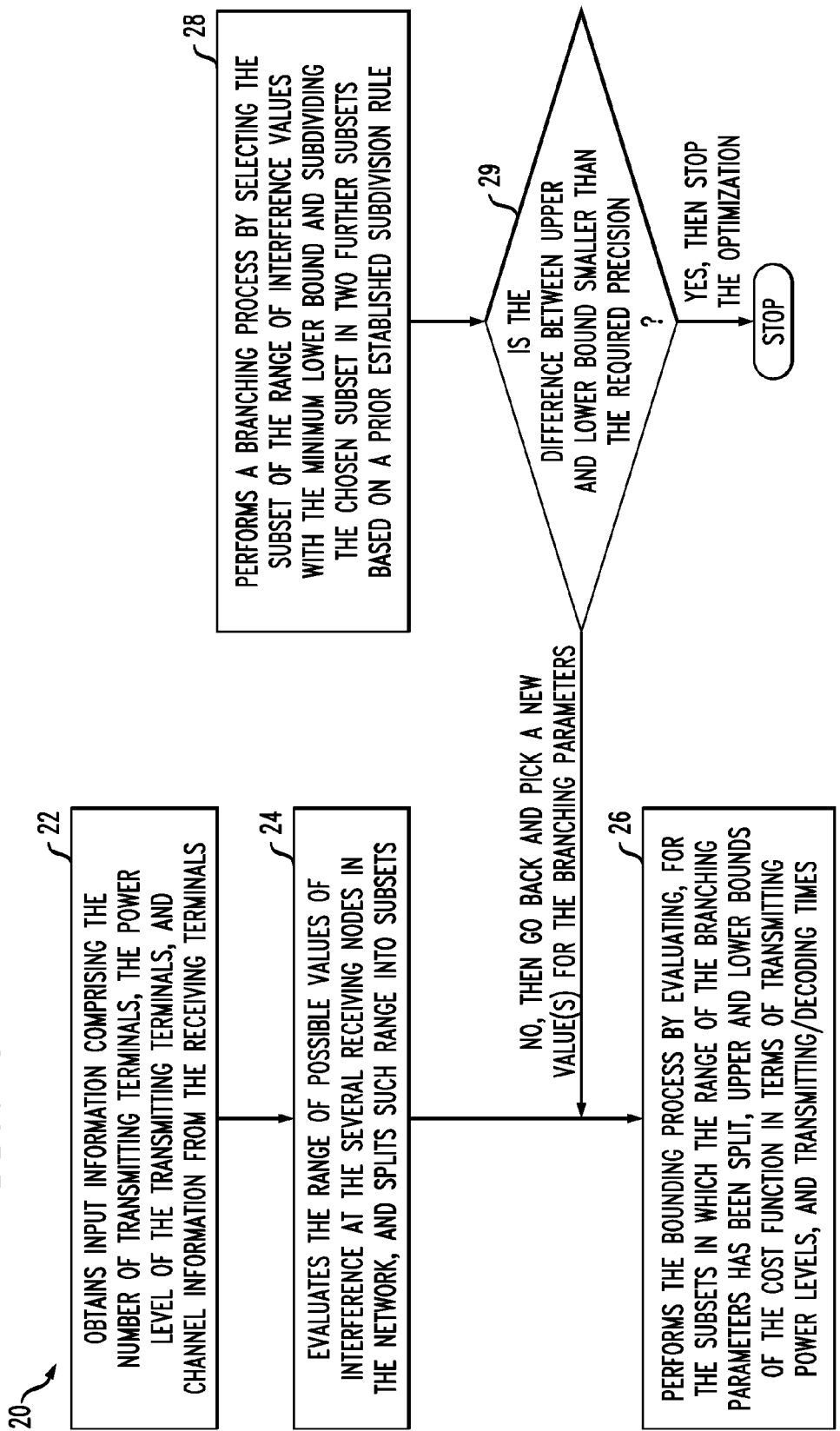
FIG. 2 is a flow diagram illustrating an interference coordination methodology according to an embodiment of the invention.

FIG. 2 is a flow diagram illustrating an interference coordination methodology according to an embodiment of the invention. The methodology 20 is performed in the interference coordination system 16 of FIG. 1.

As shown, step 22 of the methodology obtains input information comprising the number of transmitting terminals, the power level of the transmitting terminals, and channel information from the receiving terminals. It is to be understood that the number of transmitting terminals comprises the number of transmitting terminals that are in the cellular network (or the part of the cellular network) over which it is desired to perform optimized resource allocation based on interference coordination in accordance with the invention.

In step 24, the methodology uses the input information obtained in step 22 and evaluates the range of possible values of interference at the several receiving nodes (e.g., relays and destinations) in the network. Then, the methodology splits such range into subsets (e.g., two subsets).

That is, in step 24, the interference coordination system (16 in FIG. 1) uses the channel information from the receiving terminals (e.g., channel state information fed back to receiving terminals) and the power constraints at the specified transmitting terminals to evaluate the range of branching parameters (i.e., the range of possible values of interference at the several receiving nodes in the network and a fixed order of transmitting times and decoding times), and splits such range into subsets.

In step 26, the methodology performs the bounding process. The bounding process gets as input the set of subsets in which the range of the branching parameters has been split. For each of such subsets, the methodology evaluates an upper bound and a lower bound of a given cost function in terms of transmitting power levels and transmitting times/decoding times. The methodology outputs the corresponding values of transmitting power levels, and transmitting times and decoding times for which the above-mentioned lower bound is achieved.

That is, in the bounding process, the interference coordination system (16 in FIG. 1), for each subset of the range of interference values and for the transmitting time and decoding time order fixed in step 24:

1) evaluates a lower bound and an upper bound of the cost function; and
2) outputs the values transmitting times and decoding times, and transmitting power level, for which the computed lower bound is achieved.

After this step, to each subset of the range of interference values, a lower and an upper bound of the cost function is consequently assigned.

In step 28, the methodology performs a branching process. The branching process (which is recursively applied), based on the bounding process performed in step 26, selects the subset of the range of interference values with the minimum lower bound and subdivides the chosen subset into two further subsets based on a prior established subdivision rule. Since the recursive application of the branching process defines a tree structure (the search tree) whose nodes are the subsets of the range of possible interferences, this process is referred to as branching process and the possible interference values at the several receiving nodes (e.g., relays and destinations) in the network are referred as branching parameters.

In step 29, a decision is made as to whether or not the optimization methodology should continue. The decision is based on determining if a difference between the evaluated upper bound and the evaluated lower bound is within a desired precision value.

If yes in step 29, the optimization stops and the methodology sends the optimization results (resource allocations) to the appropriate communication nodes 12 (i.e., transmitting terminals and/or receiving terminals) to be implemented. Implementation of such optimization results that are generated in accordance with the interference coordination techniques of the invention has the advantage of improving the performance of the communication network.

However, in step 29, if the difference between the evaluated upper bound and the evaluated lower bound is not within the desired precision value, then the methodology returns to step 26 for the optimization to continue.

Given the above detailed description of the interference coordination system 16 and methodology 20, according to embodiments of the invention, the remainder of the detailed description will provide detailed descriptions of further illustrative embodiments in the context of a relay-assisted cellular network with various configuration assumptions. It is to be appreciated that the principles of the invention are not limited to any specific configuration assumptions. First, section I below gives a general description of an illustrative relay-assisted cellular network in which interference coordination principles of the present invention, as described above in the context of FIG. 2, may be implemented.

I. Relay-Assisted Cellular Network

As mentioned above, relaying technology has been proposed in the LTE-Advanced standard as a promising technology to improve average rates, edge rates and coverage. In a relay-assisted cellular network, relay nodes may improve performance of a weak direct link between the base station node and the user terminal node.

However, it is realized that there are several considerations associated with the use of such relays. First, consideration should be given to which relays should be allowed to transmit and how can relay transmissions be coordinated to ensure an overall improvement in system performance accounting for the added interference relays will cause. Second, consideration should be given to how a lack of channel state information (CSI) at the transmitting terminal affects the first consideration.

To illustrate how the interference coordination principles of the invention address the above and other considerations, a synchronous cellular network comprising 19 base stations, with three sectors per base station serving one user terminal per sector at any one time and frequency resource, is used as the exemplary communication network. Further, for the sake of simplicity, we consider only one tone per slot which can be seen as a single time-frequency tile in an Orthoganl Frequency Division Multiplexing Access (OFDMA) system such as is the case in the LTE-Advanced standard. It is assumed that the relays are placed at half way along the sector center.

Figure 3:
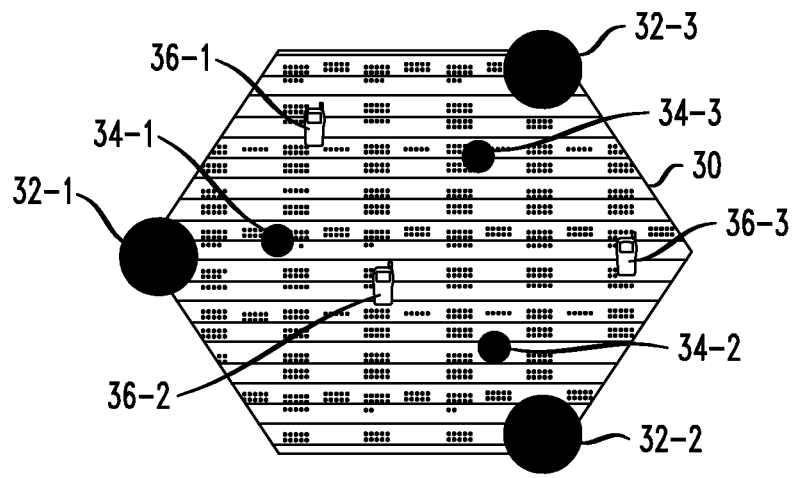
FIG. 3 is a diagram illustrating an example of interfering relay-channels in accordance with which interference coordination techniques according to an embodiment of the invention may be implemented.

Still further, for the sake of simplicity and as depicted in FIG. 3, we consider a coordination cluster of three sectors formed by three respective sources 32-1, 32-2 and 32-3 located at alternating vertices of a hexagon 30, with one relay node (34-1, 34-2, 34-3) and one user terminal node (36-1, 36-2, 36-3) per sector. Recall that a source refers to a sector of a base station or the entire base station itself (if not divided into sectors). Thus, FIG. 3 illustrates an example where three one-relay channels interfere with each other.

Figure 4:
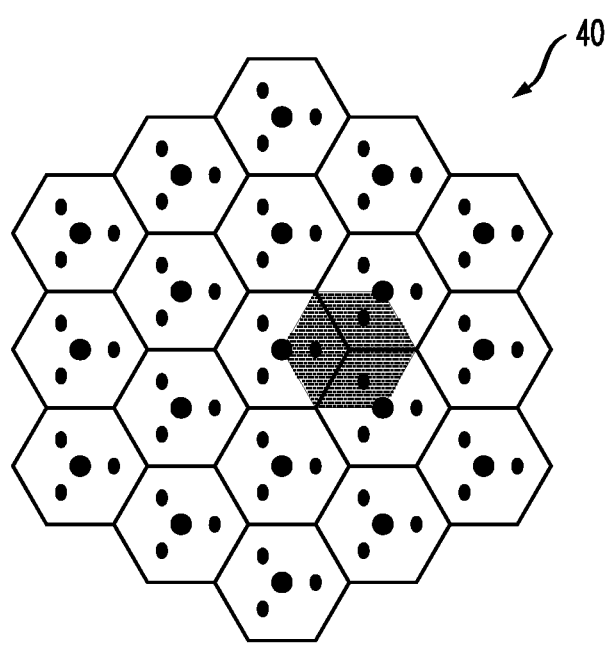
FIG. 4 is a diagram illustrating an example of a cellular network in accordance with which interference coordination techniques according to an embodiment of the invention may be implemented.

Assume further that the overall cellular network in which interference coordination principles of the invention will be implemented consists of 19 such hexagons with wrap around functionality. This is depicted as network 40 in FIG. 4. Assume that the user terminals associate with a sector according to the sector offering the closest propagation distance to the base station. This may or may not be the same association according to geographical distance. There is no coordination between sectors of different hexagons, as shown in FIG. 4.

We consider half-duplex relay channels in which communication takes place in two consecutive (orthogonal) time slots. In general, the time slot durations need not be equal. In the first time-slot of duration v, the source sends information to the destination at a given rate $R_1$ while this information is simultaneously received by the relay. The second time-slot of duration (1−v) starts when the relay has decoded the message. Then, the relay re-encodes and re-transmits the message, enhancing the source to destination link. During the second time slot, the base station can continue to transmit the same information at rate $R_1$ or, taking advantage of the improved channel conditions, transmit new information at a new rate $R_2$.

The class of relaying techniques described above are known as "Decode and Forward" (DF) and can be adaptive in the sense that the relative durations of the timeslots are optimized based on the channel conditions. Note that in the presence of multiple interfering half-duplex-relay channels this optimization must take into account all sources of mutual interference.

To reduce complexity in the 19 base station case, we optimize only within a coordination cluster. While this optimization is performed ignoring interference from other hexagons, the achievable rates are then computed making full account of it.

Given this illustrative cellular network, in the following section II, we formulate the general optimization scheme for interference coordination in completely arbitrary interfering half-duplex relaying channel, which results in a optimal (in the sense of maximizing a suitable performance measure) resource allotment in terms of fractional transmission time of the all mutually interfering transmitting nodes and in terms of the power allocations for transmissions at the sources and the relays. Specifically, subsection II-A sets up some of the notation and definitions that are going to be used in the derivation of the inventive optimization method. In subsection II-B, we describe the "decode and forward" (DF) transmission schemes that we are going to employ in our setup, each of which is based on different knowledge of the channel state information (CSI) at the transmitting terminal. In subsections II-C, II-D and II-E, we introduce the very general formulation of the optimization problem and we specialize it to the cases of perfect CSI, partial CSI and statistical CSI at the transmitting terminals.

Then, in section III, we introduce some of the definitions and results from the non-convex global optimization theory (subsection III-A) and we apply them to the inventive methodology in order to prove convergence and zero-gap duality results for our optimization methods (subsection III-B). Insubsection III-C, we further, illustrate an algorithm for obtaining the optimal resource allocation and we prove that the proposed algorithm converges to the optimal solution within an $\epsilon$-precision in a finite number of steps.

In subsection IV-A, we apply the inventive optimization approach in order to find the optimal resource allocation that mitigates the interference based on a throughput maximization criterion and an equal-rate maximization criterion to a scenario where the three interfering one-relay channels are located inside an ideal hexagonal cell. We analyze the performance of the proposed transmission scheme in terms of user rate and throughput. Finally, in subsection IV-B, we analyze the performance of the transmission scheme derived in subsection IV-A in a cellular setup composed by a 19 cell wrap around arrangement (as depicted in FIG. 4).

II. Optimal Resource Allocation for Mutually Interfering Relays Channels

As mentioned above in section I, a goal is to identify the best achievable performance of a synchronous cellular relay network such as the one depicted in FIG. 4. Of course, such a scenario includes: interference channels, broadcast channels (given the nature of the cellular system using the common wireless channel), relay channels (given the assumption that in each sector there is a relay that potentially is going to assist the communication between source and user) and generalizations thereof. Thus, an information-theoretical characterization of such a complex scenario is extremely complex. Consequently, the approach that will be followed, specifically in this section, is to identify a class of cooperative transmission protocols for relay channels, specifically DF schemes and try to optimize them in terms of resource allocations, in order to achieve the best interference coordination and the best benefits from the presence of the relays. We will do this in a unified framework that systematizes the notion of interference coordination and subsumes in the set of the possible transmission-protocol solutions for the optimization scheme, several of the most popular and common transmission protocols for interference coordination (IC) like orthogonal transmission schemes, fractional frequency reuse transmission schemes, as well as the classical power control methods, while at the same time, and admits new transmission-protocol solutions much more flexible and general than previous IC methods, since it introduces, for the destinations whose corresponding source mutually interfere, the additional flexibility of different decoding time.

The proposed optimization problem is performed looking at a completely general setup with Q mutually interfering one-relay channels. Each one-relay channel is defined as a triplet source/relay/destination. As will be evident in section III, such optimization problem, given its completely general and flexible nature, has the limitation that its complexity can grow exponentially with the number of interfering one-relay channels jointly optimized. Thus, the optimization of the entire network with counts of a 19 cell interfering coordination cluster (each counting for three interfering one-relay channels) will be conducted taking a sub-optimal lower-complexity approach: specifically, we perform the optimization problem within a coordination cluster (as depicted in FIG. 3), ignoring interference from other hexagons. However, the achievable rates, numerically evaluated and illustrated in section IV-B, are then computed making full account of it.

A. System Model

Let us consider a interference relay network with Q mutually interfering one-relay channels sharing the same bandwidth. Each one-relay channel is defined as the triplet source/relay/destination. For all $\mathcal{Q}$ one-relay channels, the relays are assumed to operate in a half-duplex mode and employing a DF communication protocol. Each of the $\mathcal{Q}$ one-relay channels is identified by a distinct and fixed index l with l=1, ..., $\mathcal{Q}$. For each l=1, ..., $\mathcal{Q}$, let us denote by: $h_{SD,l}$, $h_{SR,l}$ and $h_{RD,l}$ the complex-valued channel coefficients that characterize the links between, respectively Source$\Rightarrow$Destination, Source$\Rightarrow$Relay, and Relay$\Rightarrow$Destination for the l-th relay channel with l=1, ..., $\mathcal{Q}$.

Since we are in the presence of mutually interfering one-relay channels, we need also to account for crossing interfering links between any transmitting node of the i-th one-relay channel and any receiving node of the l-th one-relay channel. To this end, we denote by $\gamma_{S,i}^{D,l}$, by $\gamma_{R,i}^{D,l}$ the links between the source and the relay, respectively, of the i-th one-relay channel and the destination of the l-th one-relay channel; while we denote by $\gamma_{S,i}^{R,l}$ the links between the source of the i-th one-relay channel and the relay of the l-th one-relay channel, Finally, by $\gamma_{R,i}^{R,l}$, we denote the links between the relay of the i-th one-relay channel and the relays of the l-th one-relay channel. Note that, by definition, $\gamma_{S,i}^{D,l}=h_{SD,l}$, $\gamma_{S,i}^{R,l}=h_{SR,l}$, and $\gamma_{R,i}^{D,l}=h_{SD,l}$.

In our scenario, we assume that the receiving terminals have perfect CSI (i.e., the receiving terminal has perfect knowledge of its' channel and consequently, at the receiving terminal, coherent detection is employed.

In the setup that we consider, each of the $\mathcal{Q}$ sources has to transmit a message to its corresponding destination with possible help from the relay, using a common wireless channel. Let us denote by [0 T], the entire time duration during which all these communications take place. We assume the block-fading channel model where the fading stays constant over the total time-interval [0 T]. For each of the $\mathcal{Q}$ interfering one-relay channels, we want to identify instants of special importance: i) the instant $\alpha_i T$ when the source of i-th one-relay channel begins to transmit, ii) the instant $\alpha_{i+Q} T$ when the relay of i-th one-relay channel begins to transmit, and iii) the instant $\alpha_{i+2Q} T$ when the destination i-th one-relay channel decodes the message. In the degenerate case when the relay never is going to help the communication, we set $\alpha_i = \alpha_{i+Q}$. For each i∈{1, ..., $\mathcal{Q}$}, $\alpha_i \leq \alpha_{i+Q} \leq \alpha_{i+2Q}$. Furthermore, based on its definition, we have that:

$$\max_{i \in \{1, \ldots, \mathcal{Q}\}} \alpha_{i+2Q} = 1, \quad (1)$$

and $$\min_{i \in \{1, \ldots, \mathcal{Q}\}} \alpha_i = 0. \quad (2)$$

It is then useful to introduce a 3$\mathcal{Q}$-dimensional vector:

$$\alpha = [\alpha_1, \ldots, \alpha_i, \ldots, \alpha_Q, \alpha_{1+Q}, \ldots, \alpha_{i+Q}, \ldots, \alpha_{2Q}, \ldots \alpha_{1+2Q}, \ldots, \alpha_{i+2Q}, \ldots, \alpha_{3Q}] \quad (3)$$

where $\alpha_i$, $\alpha_{i+Q}$ and $\alpha_{i+2Q}$, for all i=1, ..., $\mathcal{Q}$, for all i=1, ..., $\mathcal{Q}$, are the aforementioned source onset time, relay onset time and destination message received time, respectively. In the following, we will refer to $\alpha_n$ for all n=1, ..., 3$\mathcal{Q}$ as instants and we will refer to $\alpha$ as an instant vector. Even though it will be discussed further below, note that despite the fact that each $(\alpha_{i+Q}, \alpha_{i+2Q})$ pair with i=1, ..., $\mathcal{Q}$ depends on channel quality conditions which is in generally different among i, $\alpha_i$, $\alpha_{i+Q}$ as well as $\alpha_{i+2Q}$ can be partially fixed or optimized apriori based on the cooperative transmission policy that we are going to employ. In particular, allowing any of the $\{\alpha_{i+2Q}\}_{i=1}^{Q}$ being different and different from one implies that we allow each destination to accumulate different rates and have different decoding times. Notice that the time-dynamic evolution of the $\mathcal{Q}$ interfering channels depends on such pairs $\alpha_i$, $\alpha_{i+Q}$, $\alpha_{i+2Q}$ with i=1, ..., $\mathcal{Q}$: for example, each $\alpha_i T$ represents the instant when the source of the i-th one-relay channel starts to transmit and consequently at each $\alpha_i T$ the interference suffered by the other one-relays channels is going to increase. Likewise, each $\alpha_{i+Q} T$ represents the instant when the relays of the i-th one-relay channel starts to transmit and consequently at each $\alpha_{i+Q} T$ the interference suffered by the other one-relays channels is going to increase.

Analogously, each $\alpha_{i+2Q} T$ represents the instant when the destination of the i-th one-relay channel decodes the message. At this instant, both source and relays of i-th one-relay channel stops transmitting and consequently, again, at each $\alpha_{i+2Q} T$, the interference level changes. Thus, the system has an intrinsic block-time-varying nature: at each $\alpha_i T$, $\alpha_{i+Q} T$ or $\alpha_{i+2Q} T$ which are the instants when a new event occurs (one of the relays start to transmit or one of the destinations has decoded the message), the system changes, however it remains constant in the time interval between two consecutive events. In order to explicitly describe the time evolution of such channels, we introduce a reordered 3$\mathcal{Q}$-dimensional vector, $\alpha_\sigma$, whose components are the components of $\alpha$ listed in non-decreasing order and $\sigma$ is a permutation which belongs to the symmetric group, $\Sigma_{3Q}$, (i.e., the set of all permutations of the indices $\{1, \ldots, 3\mathcal{Q}\}$) such that:

$$\alpha_{\sigma(1)} \leq \alpha_{\sigma(2)}, \leq \ldots, \leq \alpha_{\sigma(3Q)}. \quad (4)$$

Note that, for all i=1, ..., 3$\mathcal{Q}$, $\sigma(i) \in \{1, \ldots, 3\mathcal{Q}\}$. Furthermore, $\sigma(1)$, for example, gives the index of the one-relay channel whose source starts as first; $\sigma(2)$, if $\sigma(2) \leq \mathcal{Q}$, gives index of the one-relay channel whose source starts as second, if $\mathcal{Q} \leq \sigma(2) \leq 2\mathcal{Q}$, gives index of the one-relay channel whose relays starts as second, otherwise it represents the index of the one-relay channel whose destination finishes as first, in general for any i=1, ..., 3$\mathcal{Q}$, if $\sigma(i) \leq \mathcal{Q}$, then $\sigma(i)$ gives index of the one-relay channel whose source starts at the i-th time instant, if $\mathcal{Q} \leq \sigma(i) \leq 2\mathcal{Q}$, then $\sigma(i)$ gives index of the one-relay channel whose relay starts at the i-th time instant otherwise it represents the index of the one-relay channel whose destination finishes at the i-th time instant.

Now, let:

$$v_j = \alpha_{\sigma(j+1)} - \alpha_{\sigma(j)}, j=1, \ldots, 3\mathcal{Q}-1 \quad (5)$$

be the fraction of time between two consecutive instants at which a new event occurs.

It is assumed that an optimized allocation of the transmitting powers at the transmitting nodes (sources or relays) will apply, with the state of the power vector holding constant for the duration of each time-interval between two consecutive events, but typically changing from one time-interval to the next. In fact, let us denote by $\{P_S(j,n)\}$ and $\{P_R(j,n)\}$, with $n=1,\ldots,3\mathcal{Q}-1$ and $j=1,\ldots,\mathcal{Q}$, respectively the source- and relay-transmit powers over the n time slot of duration $v_n T$ starting at $\alpha_{o(n)}T$ and finishing at $\alpha_{o(n+1)}T$. The average power constraint, on each time slot duration $v_n$, is such that $P_S(j,n) \leq P$ and $P_R(j,n) \leq P$, for all $n=1,\ldots,2\mathcal{Q}$ and $j=1,\ldots,\mathcal{Q}$.

Notice that, for all $l=1,\ldots,\mathcal{Q}$, $\alpha_l T$, represents the instant when the source of the l-th one-relay channel starts to transmit. Thus, defining $\sigma^{-1} \in \Sigma_{3\mathcal{Q}}$ as the inverse of the permutation a $\sigma \in \Sigma_{3\mathcal{Q}}$, $\sigma^{-1}(l)$ gives the instant order at which the relay of the l interfering relay channel starts to be active. Consequently, it follow immediately that $P_S(j,n)=0$ if $n<\sigma^{-1}(j)$ since this implies that until the end of n−1 slot the source of the j-th one-relay channel is still off.

In choosing the specific DF protocol (e.g., partial decoding-and-forwarding, dynamic decoding-and-forwarding, etc.), we assume that the $\mathcal{Q}$ mutually interfering sources have knowledge of the vector $\alpha$ and consequently of the instants when a new event, which is going to change the level of the interference, occurs. This implies that each source in the interference relay network could, in principle, adopt rate adaptation to the changed channel conditions and improve the performance. This is an immediate generalization of the so-called partial decode-and-forward which is a well-known and established DF protocol in the case of one-relay. In our case, we assume that each of the $\mathcal{Q}$ one-relay channels use the classical partial decoding-and-forward: starting from instant $\alpha_l T$ until instant $\alpha_{i+\mathcal{Q}} T$, the source of the i-th one-relay channel sends a message $w_{R,i}$ to the destination at a given rate $R_1$ and this information is received by the corresponding relay at the same time. Starting from $\alpha_l T$, if the relay has successfully decoded message $w_{R,i}$, then the relay re-encodes it and re-transmits it, assisting the source, which taking advantage of the improved channel conditions due to transmission of the relay, sends the previous message $w_{R,i}$ with a fraction $\beta_i$ of its total power while it uses the remaining $(1-\beta_i)$ fraction of its power to start the transmission of new message $w_{D,i}$.

Using the foregoing notation, a goal, in the next section, is to formulate a joint optimization scheme devoted to finding the optimum (in the sense of maximizing a suitable performance measure) resource allocation in terms of the instants vector $\alpha$ (or equivalently in terms of the fractional time duration $v_n = \alpha_{o(n+1)} - \alpha_{o(n)}$ with $n=1,\ldots,3\mathcal{Q}-1$), and in terms of the fractions $\beta_j$ and the power allocation $\{P_S(j,n)\}$ and $\{P_R(j,n)\}$ with $n=1,\ldots,3\mathcal{Q}-1$ and $j=1,\ldots,\mathcal{Q}$.

In designing the joint optimization transmission scheme, we distinguish three cases for the CSI at the transmitters: i) complete CSI, ii) partial CSI (i.e. only knowledge of the amplitude of the fading coefficients), and iii) only statistical CSI.

In all scenarios that we analyze, we assume that the inputs transmitted by the either the source or the relay of the l one-relay channel during the n-th time interval of duration $v_n$ with $n=1,\ldots,3\mathcal{Q}-1$ are modeled by a sequence of zero-mean Gaussian independent random variables with variance $P_S(j,n)$ and $P_R(j,n)$ holding constant for the duration of each of the time intervals, but eventually changing from one interval to the next. Note that the input transmitted, over the same channel-use, by the source and the relay of the same one-relay channel can be, in principle, correlated.

In addition to the additive interference produced by the transmitting terminals of the coexisting interfering one-relay channels, which based on the CSI available at the transmitting terminals can be either modeled as Gaussian or non-Gaussian, we also assume an additive Gaussian noise modeled by sequence of zero-mean independent Gaussian random variables with unit variance.

B. Transmission Protocol

In this section we describe two different decode and forward transmission schemes that we are going to employ in the following section. Each of them is based on different knowledge of the channel state information (CSI) at the transmitting terminal.

In both schemes, we assume that each of the $\mathcal{Q}$ mutually interfering sources split the message into two independent parts: a part $w_{R,l}$ which is transmitted through the relay to the destination at a rate $R_{R,l}$ during the entire transmission, and a part $w_{D,l}$ which is transmitted directly to the destination without the help of the relay at a rate $R_D(l)$. The total rate is then $R_l = R_R(l) R_D(l)$.

Before proceeding further in the description of the DF transmission protocols, let us now introduce some notation and definitions that are going to be useful in the subsequent derivation.

Define $\Xi$ as the $\mathcal{Q}(4\mathcal{Q}-1)$-dimensional random vector whose elements count for the fading coefficient that characterize all the possible communication links in the hexagon, i.e.

$$\Xi = [h_{SD,i}, h_{SR,i}, h_{RD,i}, \gamma_{S,i}^{R,l}, \gamma_{S,i}^{D,l}, \gamma_{R,i}^{R,l}, \gamma_{R,i}^{D,l}, \quad i \neq l = 1,\ldots,\mathcal{Q}] \quad (6)$$

At instant $t=\alpha_l T$, the l source, with $l=1,\ldots,\mathcal{Q}$, starts to transmit a first message $w_{R,l}$ at rate $R_R(l)$. For notational convenience, we denote by $x_{S,l}^{(l)}(w_{R,l})$ the signal transmitted by the l source over the entire interval $[0, \alpha_{l+\mathcal{Q}} T]$. Given the assumption that the l source starts transmitting only at $t=\alpha_l T$, $x_{S,l}^{(l)}(w_{R,l})$ is modeled as a signal having $(\alpha_{l+\mathcal{Q}} - \alpha_l)M$ independent and identically distributed (i.i.d.) elements distributed according to a Gaussian distribution with power profile described by $\{P_S(l,n)\}$ with:

$$P_S(\ell, n) = \begin{cases} 0 & \text{for } n < \sigma^{-1}(\ell) \\ \neq 0 & \text{for } \sigma^{-1}(\ell) \leq n < \sigma^{-1}(\ell + \mathcal{Q}) \end{cases}$$

The rate $R_R(l)$ is chosen by the l-th source such that by the time instant $t=\alpha_{l+\mathcal{Q}} T$, the relay has been able to decode the message $w_{R,l}$ sent by the corresponding source. This implies that $R_R(l)$ has to satisfy the following inequality:

$$R_R(\ell) \leq \frac{1}{M} I(x_{S,\ell}^{(l)}(w_{R,\ell}); y_{R,\ell}) \quad (7)$$

where $I(x_{S,l}^{(l)}(w_{R,l}); y_{R,l})$ represents the mutual information between $x_{S,l}^{(l)}(w_{R,l})$ and $y_{R,l}$ with $x_{S,l}^{(l)}(w_{R,l})$ denoting the entire signal $x_{S,l}^{(l)}(w_{R,l})$ transmitted over the time interval $[0, \alpha_{l+\mathcal{Q}} T]$ and with $y_{R,l}$ representing the corresponding received signal. Given the Gaussian assumption on $x_{S,l}^{(l)}(w_{R,l})$, we have that equation (7) becomes:

$$R_R(\ell) \leq \sum_{n=1}^{\sigma^{-1}(\ell+\mathcal{Q})} v_n \log\left(1 + \frac{|h_{SR,\ell}|^2 P_S(\ell, n)}{1 + \mathcal{L}_{n,\ell}^{(R)}(\sigma, P_S(\cdot,\cdot), P_R(\cdot,\cdot), \Xi)}\right) \quad (8)$$

Where, in equation (8), $P_S(l,n)=0$ for $n<\sigma^{-1}(l)$ and where $\mathcal{I}_{n,l}^{(R)}(\sigma,P_S(.,.),P_R(.,.),\Xi)$, with $n=1,\ldots,\sigma^-(l+Q)$, denotes the variance profile of the additive gaussian disturbance over the link Source/Relays of the l-th relay channel, during the time interval $[0,\alpha_{l+Q}T]$ (see equation (28)).

Since the relay has now decoded the message $w_{R,l}$ sent by the corresponding source, it re-encodes such message and at the instant $t=\alpha_{l+Q}T$, the relay starts to transmit it using a signal $x_R(w_{R,l})$, which has $(\alpha_{l+2Q}-\alpha_{l+Q})M$ elements distributed i.i.d. according to a Gaussian distribution with power profile described by $P_R(l,n)$ with $\sigma^-(l+Q)\leq n<\sigma^-(l+2Q)$.

The transmission from the relay continues for the entire time interval $[\alpha_{l+Q}T,\alpha_{l+2Q}T]$ and stops at $t=\alpha_{l+2Q}T$, corresponding to the instant when the destination has been able to decode all the messages.

During the same time interval $[\alpha_{l+Q}T,\alpha_{l+2Q}T]$, the source transmits a superposition, $x_S^{(2)}(w_{R,l},w_{D,l})=x_S^{(2)}(w_{R,l})+x_S^{(2)}(w_{D,l})$, of the two messages $w_{R,l}$ and $w_{D,l}$, which has $(\alpha_{l+2Q}-\alpha_{l+Q})M$ elements distributed i.i.d. according to a Gaussian distribution with power profile described by $P_S(l,n)$ with $\sigma^{-1}(l+Q)\leq n<\sigma^{-(l+2Q)}$. Let denote the fraction of the total transmitting power assigned by source to the message $w_{R,l}$ and $1-\beta$ the remaining fraction assigned to the message $w_{D,l}$.

The destination successively decodes $w_{R,l}$ and $w_{D,l}$, in this specific order. This implies that denoting by $R_l$, the rate achieved by the destination of the l-th relays channel, which is given by the sum of $R_R(l)$, $R_D(l)$, the following inequalities have to be satisfied:

$$R_l = R_R(l) + R_D(l) \tag{9}$$

$$\leq \frac{1}{M}I(x_{S,l}^{(1)}(w_{R,l}), x_S^{(2)}(w_{R,l},w_{D,l}), x_R(w_{R,l}); y_{D,l}^{(1)}, y_{D,l}^{(2)}) \tag{10}$$

$$R_D(l) \leq \frac{1}{M}I(x_{S,l}^{(2)}(w_{D,l}); y_{D,l}^{(2)} | x_S^{(2)}(w_{R,l},w_{D,l}), x_R(w_{R,l})) \tag{11}$$

where:
$I(x_{S,l}^{(1)}(w_{R,l}), x_S^{(2)}(w_{R,l},w_{D,l}), x_R(w_{R,l}); y_{D,l}^{(1)}, y_{D,l}^{(2)}))$ represents the mutual information between the input signal $[x_{S,l}^{(1)}(w_{R,l}), x_S^{(2)}(w_{R,l},w_{D,l})]$ transmitted over the time interval $[0,\alpha_{l+2Q}T]$ and the corresponding received signal $[y_{D,l}^{(1)}, y_{D,l}^{(2)}]$. Specifically, $y_{D,l}^{(1)}$ is the signal received at the destination during the interval $[0,\alpha_{l+2Q}T]$, while $y_{D,l}^{(2)}$ denotes the signal received by the destination over the time interval $[\alpha_{l+Q}T,\alpha_{l+2Q}T]$.

Given the Gaussian assumption on $x_{S,l}^{(1)}(w_{R,l})$, we have that equations (10) and (11) become:

$$R_R(l) + R_D(l) \leq \tag{12}$$

$$\sum_{n=1}^{\sigma^{-1}(l+Q)} v_n \log\left(1 + \frac{|h_{SD,l}|^2 P_S(l,n)}{1+\mathcal{I}_{n,l}^{(D)}(\sigma, P_S(\cdot,\cdot), P_R(\cdot,\cdot),\Xi)}\right) +$$

$$\sum_{n=\sigma^{-1}(l+Q)+1}^{\sigma^{-1}(l+2Q)} v_n \log\left(1 + \frac{\beta_l |h_{SD,l}|^2 P_S(l,n) + |h_{RD,l}|^2 P_R(l,n) + \zeta_{l,n} + (1-\beta_l)|h_{SD,l}|^2 P_S(l,n)}{1+\mathcal{I}_{n,l}^{(D)}(\sigma, P_S(\cdot,\cdot), P_R(\cdot,\cdot),\Xi)}\right)$$

$$R_D(l) \leq \sum_{n=\sigma^{-1}(l+Q)+1}^{\sigma^{-1}(l+2Q)} v_n \log\left(1 + \frac{(1-\beta_l)|h_{SD,l}|^2 P_S(l,n)}{1+\mathcal{I}_{n,l}^{(D)}(\sigma, P_S(\cdot,\cdot), P_R(\cdot,\cdot),\Xi)}\right)$$

where $\mathcal{I}_{n,l}^{(D)}(\sigma,P_S(.,.),P_R(.,.),\Xi)$, with $n=1,\ldots,\sigma^{-1}(\alpha_{l+2Q})$, denotes the variance profile of the additive gaussian disturbance over the links Source/Destination and Relay/Destination of the l-th relay channel, during the time interval $[0,\alpha_{l+2Q}T]$ (see equation (29)). Finally, in equation (12), $\zeta_{l,n}$ is such that:

$$\zeta_{l,n} = \Re\{\rho_{l,n}h_{SD,l}h^*_{RD,l}\} \tag{13}$$

where $$\mathbb{E}[x_S^{(2)}(w_{R,l})x_R^\dagger(w_{R,l})] = \text{diag}(\rho_{l,1},\ldots,\rho_{l,N_2}) \tag{14}$$

with $N_2=(\alpha_{l+2Q}-\alpha_{l+Q})M$.

From equations (8) and (12), we have that:

$$R_R(l) + R_D(l) \leq \tag{15}$$

$$\sum_{n=1}^{\sigma^{-1}(l+Q)} v_n \log\left(1 + \frac{|h_{SD,l}|^2 P_S(l,n)}{1+\mathcal{I}_{n,l}^{(D)}(\sigma, P_S(\cdot,\cdot), P_R(\cdot,\cdot),\Xi)}\right) +$$

$$\sum_{n=\sigma^{-1}(l+Q)+1}^{\sigma^{-1}(l+2Q)} v_n \log\left(1 + \frac{\beta_l |h_{SD,l}|^2 P_S(l,n) + |h_{RD,l}|^2 P_R(l,n) + \zeta_{l,n} + (1-\beta_l)|h_{SD,l}|^2 P_S(l,n)}{1+\mathcal{I}_{n,l}^{(D)}(\sigma, P_S(\cdot,\cdot), P_R(\cdot,\cdot),\Xi)}\right)$$

$$R_R(l) + R_D(l) \leq$$

$$\sum_{n=1}^{\sigma^{-1}(l+Q)} v_n \log\left(1 + \frac{|h_{SR,l}|^2 P_S(l,n)}{1+\mathcal{I}_{n,l}^{(D)}(\sigma, P_S(\cdot,\cdot), P_R(\cdot,\cdot),\Xi)}\right) +$$

$$\sum_{n=\sigma^{-1}(l+Q)+1}^{\sigma^{-1}(l+2Q)} v_n \log\left(1 + \frac{(1-\beta_l)|h_{SD,l}|^2 P_S(l,n)}{1+\mathcal{I}_{n,l}^{(D)}(\sigma, P_S(\cdot,\cdot), P_R(\cdot,\cdot),\Xi)}\right)$$

Hence, given that:

$$R_l = R_R(l) + R_D(l),$$

the rate achieved by the destination of the l-th relays channel is given by:

$$R_l = \min\{\tilde{R}_l, \hat{R}_l\}$$

with $\tilde{R}_l$ and $\hat{R}_l$ satisfying:

$$\tilde{R}_l \leq \sum_{n=1}^{\sigma^{-1}(l+Q)} v_n \log\left(1 + \frac{|h_{SR,l}|^2 P_S(l,n)}{1+\mathcal{I}_{n,l}^{(R)}(\sigma, P_S(\cdot,\cdot), P_R(\cdot,\cdot),\Xi)}\right) +$$

$$\sum_{n=\sigma^{-1}(l+Q)+1}^{\sigma^{-1}(l+2Q)} v_n \log\left(1 + \frac{(1-\beta_l)|h_{SD,l}|^2 P_S(l,n)}{1+\mathcal{I}_{n,l}^{(D)}(\sigma, P_S(\cdot,\cdot), P_R(\cdot,\cdot),\Xi)}\right)$$

$$\hat{R}_l \leq \sum_{n=1}^{\sigma^{-1}(l+Q)} v_n \log\left(1 + \frac{|h_{SD,l}|^2 P_S(l,n)}{1+\mathcal{I}_{n,l}^{(D)}(\sigma, P_S(\cdot,\cdot), P_R(\cdot,\cdot),\Xi)}\right) +$$

$$\sum_{n=\sigma^{-1}(l+2)+1}^{\sigma^{-1}(l+22)} v_n \log\left(1 + \frac{|h_{SD,l}|^2 P_S(l,n) + \beta_l |h_{RD,l}|^2 P_R(l,n) + \zeta_{l,n} +}{1 + \mathcal{I}_{n,l}^{(D)}(\sigma, P_S(\cdot,\cdot), P_R(\cdot,\cdot), \Xi)}\right).$$

1) Decode and Forward with Full CSI at the Transmitters and Receivers

In the case of full CSI, where both the source and relay of the l-th relay-channel are able to synchronize and have complete synchronized CSI, i.e., attenuation ($|h_{SD,l}|$, $|h_{SR,l}|$, $|h_{RD,l}|$) and phase-delay ($\angle h_{SD,l}$, $\angle h_{SR}$ml, $\angle h_{RD,l}$) of all three links, performance can be improved by choosing an optimum value for the correlation structure, as given in equation (14), between the signals $x_S^{(2)}(w_{R,l})$ and $x_R(w_{R,l})$ and $x_R(w_{R,l})$ encoding message $w_{R,l}$ respectively at the source and at the relay, whereas the message $w_{D,l}$ is mapped onto an independent signal $x_S^{(2)}(w_{D,l})$ transmitted by the source at rate $R_D$. Specifically, the correlation in equation (14) can be optimized such that for given channel state realization the instantaneous rate (i.e. the rate achieved conditioned on a specific channel realization) is maximized. Note that in the case of time division duplex (TDD), CSI can be estimated using training sequences at the transmitters and the receivers, and then reciprocity can be invoked; while in the case of frequency devision duplex (FDD), the CSI can be estimated at the receivers (relay and destination) and fed back to the transmitters.

In this case, it is easy to prove that the optimal values for $\rho_{l,n}$ is given by:

$$\rho_{l,n} = \beta \sqrt{P_S(l,n) P_R(l,n)} \tag{16}$$

Furthermore, it is immediate to see that:

Proposition 1: The optimum value of $\beta_l$ in order to maximize the rate achieved by the destination of the l-th relays channel are either 0 or 1 or the values $\beta^*_l$ that equalize $\tilde{R}_l$ and $\hat{R}_l$, given in equation (16).

The optimal expression for $\beta$ is given in equation (34).

2) Decode and Forward with Partial CSI at the Transmitters

Different from the previous DF scheme, where full CSI is available at the transmitters and receivers, in this scheme, the transmitters have no knowledge of the phase-information of the channel coefficients. In this scenario, we assume that source and relay only know link attenuation, while phase-delay, and synchronization are not needed. This, of course, leads to a simpler implementable scheme where the requirement of CSI feedback is much less demanding, but also to a degradation in terms of the achievable performance. Given the lack of prior information at the transmitters (source and relays) of phase-delay, the correlation between the signals $x_S^{(1)}(w_{R,l})$ and $x_R(w_R(l))$ can not be exploited. We can prove the following results:

Proposition 2: The optimal correlation coefficient that maximizes the rate achievable with partial DF and no phase-information at the transmitters, is given by $\rho_{l,n}=0$ for all outage probabilities taking values in [0,1/2].

Furthermore, the optimal correlation coefficient that maximizes the average achievable rate with the partial DF and no phase-information at the transmitters, is $\rho_{l,n}=0$.

C. Cost Functions and their Optimization

Let $R_l$, with $l=1, \ldots, \mathcal{Q}$, the rate achieved by the l-th destination of the l-th relay channel, under the assumption that all $\mathcal{Q}$ relay channels employ a partial DF scheme with given instants vector:

$$\alpha[\alpha_1, \ldots, \alpha_\mathcal{Q}, \alpha_{\mathcal{Q}+1}, \ldots, \alpha_{2\mathcal{Q}}, \alpha_{2\mathcal{Q}+1}, \ldots, \alpha_{3\mathcal{Q}}]$$

and given transmitting powers $\{P_S(j,n)\}$ and $\{P_R(j,n)\}$ with $n=1, \ldots, 3\mathcal{Q}-1$ and $j=1, \ldots, \mathcal{Q}$.

Clearly, each $R_l$ with $l=1, \ldots, \mathcal{Q}$ is a function of $\alpha$, $\{P_S(j,n)\}$ and $\{P_R(j,n)\}$ with $n=1, \ldots, 3\mathcal{Q}-1$ and $j=1, \ldots, \mathcal{Q}$ as well as of the realizations of random vector $\Xi$, from which it follows that the rates $R_l$ with $l=1, \ldots, \mathcal{Q}$ are random variable with a distribution induced by the random vector $\Xi$.

Let us denote by $\mathcal{G}(R_l, \ldots, R_\mathcal{Q})$ the performance metric given by a general concave cost function of the user rates. Using the CSI available at the transmitters, we could try to either optimize both the instants vector, $\alpha^*$, and the power allocation, or only one of these two resources. We can, thus, pose several different resource-allocation optimization problems. In the following, we focus mainly on the more complete one where the optimization of the resource allocation requires finding the best resource allocation, in terms of instants vector $\alpha^*$, and power allocation $P^*_S(l,n), P^*_R(l,n)$ with $l=1, \ldots \mathcal{Q}$, in the sense of maximizing a given concave cost-function $\mathcal{G}(R)$ of the achievable rates.

In the subsequent derivations, in order to simplify the notation, with $P_S(.,.)$ and respectively $P_R(.,.)$ we will refer to the following sets:

$$P_S(.,.) \equiv \{\{P_S(j,n)\}_{j=1}^{\mathcal{Q}}\}_{n=1}^{3\mathcal{Q}-1} \tag{17}$$

and $$P_R(.,.) \equiv \{\{P_R(j,n)\}_{j=1}^{\mathcal{Q}}\}_{n=1}^{3\mathcal{Q}-1}. \tag{18}$$

Using the foregoing notation, in the next subsections, we formulate the problem of maximizing the cost function $\mathcal{G}(R_l, \ldots, R_\mathcal{Q})$ with respect to resource allocation, $\alpha^*$, $P^*_S(l,n)$, and $P^*_R(l,n)$ with $l=1, \ldots \mathcal{Q}$ and $n=1, \ldots, 3\mathcal{Q}-1$, based on the CSI available at the transmitting nodes.

Specifically we will consider the following cost functions:

The throughput (per hexagon):

$$\mathcal{G}(R_1, \ldots, R_\mathcal{Q}) = \sum_l R_l, \tag{19}$$

The minimum rate (per hexagon):

$$\mathcal{G}(R_1, \ldots, R_\mathcal{Q}) = \min\{R_1, \ldots, R_\mathcal{Q}\}, \tag{20}$$

The weighted sum rate (per hexagon):

$$\mathcal{G}(R_1, \ldots, R_\mathcal{Q}) = \sum_l \mathcal{Q}_l R_l. \tag{21}$$

D. Perfect or Partial CSI at the Transmitters

If the transmitters either have perfect CI or only know the amplitude of the several links that characterize the interfering-relay channels, then, assuming as cooperative communication scheme the DF approach, finding the best resource allocation, $\alpha^*$, and the best power allocation $P^*_S(l,n), P^*_R(l,n)$ with $l=1, \ldots \mathcal{Q}$ and $n=1, \ldots, 3\mathcal{Q}-1$, is equivalent to solving the following maximization problem:

$$\min_{\alpha \in \mathcal{V}} \min_{P_S(\cdot,\cdot), P_R(\cdot,\cdot)} -\mathcal{G}(R_1, \ldots, R_Q) \qquad (22)$$

subject to $\begin{cases} \sum \mathcal{V}_j(\alpha) = 1, \\ 0 \leq P_S(l,n) \leq P, 0 \leq P_R(l,n) \leq P, & l=1,\ldots Q, n=1,\ldots, 3Q-1 \\ R_l(\alpha, P_S(\cdot,\cdot), P_R(\cdot,\cdot), \Xi) \leq \min\{R'_l, \hat{R}_l\}, & l=1,\ldots Q. \end{cases}$ In equation (22), $\mathcal{V} \subset [01]^{3Q}$ is such that:

$$\mathcal{V} = \{\alpha \in [01]^{3Q} : \alpha_i < \alpha_{i+Q} \leq \alpha_{i+2Q}, i=1,\ldots, Q\}, \qquad (23)$$

while $R'_l$ and $\hat{R}_l$ are defined either:

as in equations (24) and (25), if the perfect CSI is available at the transmitting nodes (we can choose $\beta_l$ such that $R'_l$ is maximized; in the case that no-power control is employed, the optimum value of $\beta_l$ is given in proposition 3, equation (34)):

$$R'_l = \sum_{n=\sigma^{-1}(l)}^{\sigma^{-1}(l+Q)} \mathcal{V}_n \log\left(1 + \frac{|h_{SR,l}|^2 P_S(l,n)}{1 + \mathcal{I}_{n,l}^{(R)}(\sigma, P_S(\cdot,\cdot), P_R(\cdot,\cdot), \Xi)}\right) + \qquad (24)$$

$$\sum_{n=\sigma^{-1}(l+Q)+1}^{\sigma^{-1}(l+2Q)} \mathcal{V}_n \log\left(1 + \frac{(1-\beta_l)|h_{SD,l}|^2 P_S(l,n)}{1 + \mathcal{I}_{n,l}^{(D)}(\sigma, P_S(\cdot,\cdot), P_R(\cdot,\cdot), \Xi)}\right)$$

$$\hat{R}_l = \sum_{n=\sigma^{-1}(l)}^{\sigma^{-1}(l+Q)} \mathcal{V}_n \log\left(1 + \frac{|h_{SD,l}|^2 P_S(l,n)}{1 + \mathcal{I}_{n,l}^{(D)}(\sigma, P_S(\cdot,\cdot), P_R(\cdot,\cdot), \Xi)}\right) + \qquad (25)$$

$$\sum_{n=\sigma^{-1}(l+Q)+1}^{\sigma^{-1}(l+2Q)} \mathcal{V}_n \log\left(1 + \frac{\left|h_{SD,l}\sqrt{P_S(l,n)} + h_{RD,l}\sqrt{\beta_l P_R(l,n)}\right|^2 + (1-\beta_l)|h_{SD,l}|^2 P_S(l,n)}{1 + \mathcal{I}_{n,l}^{(D)}(\sigma, P_S(\cdot,\cdot), P_R(\cdot,\cdot), \Xi)}\right)$$

as in equation (26) and (27), if the transmitting nodes only have knowledge of the amplitude of the fading coefficients (the optimum value of $\beta_l$ is zero):

$$R'_l = \sum_{n=\sigma^{-1}(l)}^{\sigma^{-1}(l+Q)} \mathcal{V}_n \log\left(1 + \frac{|h_{SR,l}|^2 P_S(l,n)}{1 + \mathcal{I}_{n,l}^{(R)}(\sigma, P_S(\cdot,\cdot), P_R(\cdot,\cdot), \Xi)}\right) + \qquad (26)$$

$$\sum_{n=\sigma^{-1}(l+Q)+1}^{\sigma^{-1}(l+2Q)} \mathcal{V}_n \log\left(1 + \frac{|h_{SD,l}|^2 P_S(l,n)}{1 + \mathcal{I}_{n,l}^{(D)}(\sigma, P_S(\cdot,\cdot), P_R(\cdot,\cdot), \Xi)}\right)$$

$$\hat{R}_l = \sum_{n=\sigma^{-1}(l)}^{\sigma^{-1}(l+Q)} \mathcal{V}_n \log\left(1 + \frac{|h_{SD,l}|^2 P_S(l,n)}{1 + \mathcal{I}_{n,l}^{(D)}(\sigma, P_S(\cdot,\cdot), P_R(\cdot,\cdot), \Xi)}\right) + \qquad (27)$$

$$\sum_{n=\sigma^{-1}(l+Q)+1}^{\sigma^{-1}(l+2Q)} \mathcal{V}_n \log\left(1 + \frac{|h_{SD,l}|^2 P_S(l,n) + |h_{RD,l}|^2 P_R(l,n)}{1 + \mathcal{I}_{n,l}^{(D)}(\sigma, P_S(\cdot,\cdot), P_R(\cdot,\cdot), \Xi)}\right)$$

where:

-continued $$\mathcal{I}_{n,l}^{(R)}(\sigma, P_S(\cdot,\cdot), P_R(\cdot,\cdot), \Xi) = \sum_{j \neq l} |\gamma_{S,j}^{(R,l)}|^2 P_S(j,n) - \qquad (28)$$

$$\sum_{j \in S_n} |\gamma_{S,j}^{(R,l)}|^2 P_S(j,n) + \sum_{j \in \mathcal{R}_n} |\gamma_{R,j}^{(R,l)}|^2 P_R(j,n) - \sum_{j \in S_n} |\gamma_{R,j}^{(R,l)}|^2 P_R(j,n),$$

$$\mathcal{I}_{n,l}^{(D)}(\sigma, P_S(\cdot,\cdot), P_R(\cdot,\cdot), \Xi) = \sum_{j \neq l} |\gamma_{S,j}^{(D,l)}|^2 P_S(j,n) - \qquad (29)$$

$$\sum_{j \in S_n} |\gamma_{S,j}^{(D,l)}|^2 P_S(j,n) + \sum_{j \in \mathcal{R}_n} |\gamma_{R,j}^{(D,l)}|^2 P_R(j,n) - \sum_{j \in S_n} |\gamma_{R,j}^{(D,l)}|^2 P_R(j,n),$$

while:

$$\mathcal{S} = \{j=1,\ldots, Q : \sigma^{-1}(j+2Q) < n\}; \qquad (30)$$

and finally:

$$\mathcal{R} = \{j=1,\ldots, Q : \sigma^{-1}(j+Q) < n\}. \qquad (31)$$

The derivation of the achievable rates $R_l$ is a straightforward extension of the proof of proposition 2, equation (27).

Notice that $\mathcal{R}$, defines the set of relays, which are transmitting during the n-th time-interval, while $\mathcal{S}$, in equation (30), defines the set of base stations and relays, that during the n-th time-interval are inactive since their destinations have decoded their messages. Thus, the difference of the first two terms on the right side of the equality in equation (28) represents the interference produced by the sources, which are still active during n-th time-interval, and suffered by the relay of the l-th relay channel during the n-th time-interval. Furthermore, the difference of the last two terms on the right side of the equality in equation (28) represents the interference produced by the relays, still active during n-th time-interval, and suffered by the relay of the l-th relay channel during the n-th time-interval.

Analogously, while the difference of the first two terms on the right side of the equality in equation (29) represents the interference produced by the active sources of the entire interference relay network and suffered by the destination of the l-th relay channel during the n-th time-interval, the difference of the last two terms on the right side of the equality in equation (29) represents the interference produced by the active relays of the entire interference relay network and suffered by the destination of the l-th relay channel during the n-th time-interval.

The optimization problem given in equation (22) is highly non-convex. In section III, we re-formulate the foregoing optimization problem in a way that computationally efficient searching algorithms for the solution of the problem can be applied. However, in order to reduce the complexity, we could restrict the transmitting powers to take only two possible values, i.e. $P_S(n,l) \in \{0,P\}$ and $P_R(n,l) \in \{0,P\}$ for all $n=1, \ldots 3Q-1$ and $l=1, \ldots Q$. This reduces the complexity of the proposed IC scheme to a LP optimization problem with $2^{2Q}-1$ variables. Note that, even in this case, the complexity still grows exponentially (in terms of variable that have to be optimized) with the number of interfering one-relay channels. This can be seen as a more general version (in the sense that the optimization is done in the time domain) of the classical frequency fractional reuse. The complexity of the IC scheme can be further reduced if we impose in the above optimization problem $\alpha_i=0$, $\alpha_{i+2Q}=1$, $\alpha_{i+Q}=\alpha_{j+Q}=\alpha\in[0,1]$ for all i, j=1, ..., $Q$, and do not allow no-power control. In this case, considering, for example, as utility function the minimum rate, we obtain following result (note that in this scenario, the vector $\alpha$ degenerates into the 2-dimensional vector, $\alpha=[\alpha,1]$, since we have only two events occurring; consequently, the interference profile over the overall transmission is describe by only two values $\mathcal{I}_{1,l}^{(J)}$ and $\mathcal{I}_{2,l}^{(J)}$ for all l=1, ..., $Q$, and J$\in\{R,D\}$):

Proposition 3: If no-power control is allowed, assuming that the transmit powers are set to $P_S(n,l)=P_S(l)$ and $P_R(n,l)=P_R(l)$ for all n=1, ... 3$Q$−1 and l=1, ... $Q$, then for a DF scheme with perfect CSI at the transmitters, an achievable rate $R_l$ for the l-th destination, given a specific realization of the fading-coefficient vector $\Xi$, is:

$$R_l(\alpha^*, \{P_S(j)\}, \{P_R(j)\}, \Xi) = \max\{C_{SD}(l), \min\{C_{l'}(\alpha^*), \hat{C}_l(\alpha^*)\}\} \quad (32)$$

with $$C_l'(\alpha) = \alpha C_{SR}(l) + (1-\alpha)\log\left(1 + (1-\beta_l(\alpha))|h_{SD,l}|^2 \frac{P_S(l)}{1+\mathcal{I}_{2,l}^{(D)}}\right)$$

and $$\hat{C}_l(\alpha) = \alpha C_{SD}(l) + (1-\alpha)\log\left(1 + \frac{|h_{SD}|^2 P_S + |h_{RD}|^2 P_R + 2|h_{RD}||h_{SD}|\sqrt{\beta_l(\alpha)P_S P_R}}{1+\mathcal{I}_{2,l}^{(D)}}\right) \quad (33)$$

where $\alpha^*$ is the optimum (in the sense of maximizing the minimum rate) common instant at which the $Q$ relays of the $Q$ mutually interfering one-relay channels start to transmit, while:

$\beta_l(\alpha)$ is:

$$\beta_l(\alpha) = \frac{2|h_{RD}|^2 P_R(l) + \kappa_l^2(\alpha)(|h_{SD}|^2 P_S(l)+1) - \kappa_l(\alpha)(|h_{SD}|^2 P_S(l) + |h_{RD}|^2 P_R(l)+1)}{\kappa_l^2(\alpha)|h_{SD}|^2 P_S(l)} - \frac{2\sqrt{|h_{RD}|^2 P_R(l)(\kappa_l(\alpha)-1)\binom{\kappa_l(\alpha)(|h_{SD}|^2 P_S(l)+1)-}{|h_{RD}|^2 P_R(l)}}}{(\kappa_l^2(\alpha)|h_{SD}P_S(l)|^2)} \quad (34)$$

with:

$$\kappa_l(\alpha) = \left(\frac{1+|h_{SR}|^2 P_S(l)}{1+|h_{SD}|^2 P_S(l)}\right)^{\alpha(1-\alpha)^{-1}}$$

$\mathcal{I}_{2,l}^{(D)}$ denotes the interference from the other $Q$−1 sources and relays on the l-th destination in the second transmitting time-slot of fractional duration $1-\alpha^*$, $$\mathcal{I}_{2,l}^{(D)} = \sum_{j\neq l}|\gamma_{S,j}^{(D,l)}|^2 P_S(j) + \sum_{j\neq l}|\gamma_{R,j}^{(D,l)}|^2 P_R(j), \quad (35)$$

$C_{SD}(l)$ and $C_{SR}(l)$ denote the maximum rates achievable over the links between, respectively Source$\Rightarrow$Destination and Source$\Rightarrow$Relay, for the l-th relay channel with l=1, ..., $Q$, i.e.:

$$C_{SD}(l) = \log\left(1 + |h_{SD,l}|^2 \frac{P_S(l)}{1+\mathcal{I}_{1,l}^{(D)}}\right), \quad (36)$$

$$C_{SR}(l) = \log\left(1 + |h_{SR,l}|^2 \frac{P_S(i)}{1+\mathcal{I}_{1,l}^{(R)}}\right)$$

$\mathcal{I}_{1,l}^{(D)}$ and $\mathcal{I}_{1,l}^{(R)}$ represent the interference from the other $Q$−1 sources on the l-th destination and on the l-th relay respectively in the first transmitting time-slot of fractional duration $\alpha^*$, i.e:

$$\mathcal{I}_{1,l}^{(D)} = \sum_{j\neq l}|\gamma_{S,j}^{(D,l)}|^2 P_S(j), \quad (37)$$

$$\mathcal{I}_{1,l}^{(R)} = \sum_{j\neq l}|\gamma_{S,j}^{(R,l)}|^2 P_S(j),$$

The value of $\alpha^*$ is solution in [0,1] of the following equation:

$$\min_{l\in\{1,\ldots,Q\}} C_{l'}(\alpha^*, \beta_l(\alpha^*)) = \min_{l\in\{1,\ldots,Q\}} \hat{C}_l(\alpha^*, \beta_l(\alpha^*)) \quad (38)$$

if it exists; otherwise $\alpha^*=1$.

The case when the transmitters only know the amplitude of the fading coefficients can be immediately obtained from proposition 4 simply assuming $\beta_l=0$.

E. Statistical CSI at the Transmitters

If the transmitting nodes do not have any a priori information about the instantiation of the fading channel coefficients but statistical CSI is available at the transmitter, the problem of optimizing the resource allocation can be re-formulated, either focusing on minimizing the probability that the cost function is larger then a desired value (outage approach), or on maximizing average value of the cost function (ergodic approach), where both probability and average are induced by the fading coefficients vector $\Xi$.

1) Outage Approach

In the case that the focus in on minimizing the probability that the cost function is larger then a desired value, then we have:

$$\min_{\alpha\in\mathcal{V}} \min_{P_S(\cdot,\cdot),P_R(\cdot,\cdot)} \mathbb{P}\{\mathcal{G}(R_1,\ldots,R_Q) \leq \overline{\mathcal{G}}\} \quad (39)$$

subject to $\begin{cases} \sum \mathcal{V}_i(\alpha) = 1 \\ 0 \leq P_S(l,n) \leq P, 0 \leq P_R(l,n) \leq P \quad l=1,\ldots Q, n=1,\ldots,3Q-1 \\ R_l(\alpha, P_S(\cdot,\cdot), P_R(\cdot,\cdot), \Xi) \leq \min\{R_l', \hat{R}_l\} \quad l=1,\ldots Q \end{cases}$ where the probability is induced by the joint distribution of the elements (i.e., the fading coefficients) of the random vector $\Xi$, while $R'_l$ and $\hat{R}_l$ are defined either:
- as in equations (24) and (25), if the perfect CSI is available at the transmitting nodes;
- as in equations (26) and (27), if the transmitting nodes only have knowledge of the amplitude of the fading coefficients.

2) Ergodic Approach

In the case that the focus in on minimizing the average value of the cost function, then we have:

$$\min_{\alpha \in \mathcal{V}} \min_{P_S(\cdot,\cdot), P_R(\cdot,\cdot)} -\mathbb{E}_\Xi[\mathcal{G}(R_1, \ldots, R_\mathcal{L})] \quad (40)$$

subject to $$\begin{cases} \sum \mathcal{V}_l(\alpha) = 1 \\ 0 \leq P_S(\ell, n) \leq P, 0 \leq P_R(\ell, n) \leq P \quad \ell=1,\ldots\mathcal{Q}, \\ \qquad\qquad\qquad\qquad\qquad\qquad\qquad n=1,\ldots, 3\mathcal{Q}-1 \\ R_\ell(\alpha, P_S(\cdot,\cdot), P_R(\cdot,\cdot), \Xi) \leq \min\{R'_\ell, \hat{R}_\ell\} \quad \ell=1,\ldots\mathcal{Q} \end{cases}$$

where the expectation is with the respect the joint distribution of the elements (i.e. the fading coefficients) of the random vector $\Xi$, while $R'_l$ and $\hat{R}_l$ are defined either:
- as in equations (24) and (25), if the perfect CSI is available at the transmitting nodes;
- as in as in equations (26) and (27), if the transmitting nodes only have knowledge of the amplitude of the fading coefficients.

As in section II-D above, the optimization problems given in equations (39) and (40) are highly non-convex. However, at least for the optimization problem given in equation (40), the technique explained in section III allow to employ a computationally efficient searching algorithms for finding the solution to equation (40). In order to reduce the complexity, we could also impose, as already done in the previous subsection, that $\alpha_i = 0$, $\alpha_{i+2\mathcal{Q}} = 1$, $\alpha_{i+\mathcal{Q}} = \alpha_{j+\mathcal{Q}} = \alpha \in [0,1]$ and for all i, $j=1, \ldots, \mathcal{Q}$, and do not allow no-power control. In this case, considering, for example, as utility function the minimum rate, and focusing on an ergodic approach, we obtain following result:

Proposition 4: Assuming that the transmitting power $\{P_S(j)\}$ and $\{P_R(j)\}$ with $l=1, \ldots, \mathcal{Q}$ are fixed, then for a DF scheme with statistical CSI at the transmitters, an instantaneous achievable rate $R_l$ for the l-th destination that maximizes the average minimum rate, given a specific realization of the fading-coefficient vector $\Xi$, is:

$$R_\ell(\alpha^*, \{P_S(j)\}, \{P_R(j)\}, \Xi) = \min\{C'_\ell(\alpha^*), \hat{C}_\ell(\alpha^*)\} \quad (41)$$

where:

$$C'_\ell(\alpha^*) = \alpha^* C_{SR}(\ell) + (1-\alpha^*)\log\left(1 + |h_{SD,\ell}|^2 \frac{P_S(\ell)}{1+\mathcal{I}_{2,\ell}^{(D)}}\right) \quad (42)$$

$$\hat{C}_\ell(\alpha^*) = \alpha^* C_{SD}(\ell) + (1-\alpha^*) C_{SRD}(\ell)$$

where:
$\alpha^*$ is the optimal (in the sense of maximizing the average minimum rate) common instant at which the $\mathcal{Q}$ relays of the $\mathcal{Q}$ mutually interfering one-relay channels start to transmit and it is obtained solving the following LP (Linear Programming) optimization problem:

$$\alpha^* = \arg\max \mathcal{G}(P,\Xi) \quad (43)$$

subject to: $\mathcal{G}(R_1, \ldots, R_\mathcal{L}) \leq \mathbb{E}[\min\{C'_l(\alpha^*), \hat{C}_l(\alpha)\}], l=1, \ldots, \mathcal{Q}$ (44)

$C_{SRD}(l)$ denotes the maximum rates achievable over the link Source\Relay $\Rightarrow$ Destination, i.e.:

$$C_{SRD}(\ell) = \log\left(1 + |h_{SD,\ell}|^2 \frac{P_S(\ell)}{1+\mathcal{I}_{2,\ell}^{(D)}} + |h_{RD,\ell}|^2 \frac{P_R(\ell)}{1+\mathcal{I}_{2,\ell}^{(D)}}\right) \quad (45)$$

$\mathcal{I}_{2,l}^{(D)}$, $C_{SD}(l)$, and $C_{SR}(l)$ with $l=1, \ldots, \mathcal{Q}$ defined as in proposition 3.

III. Non-convex Optimization

As mentioned above, the optimization problems given in equations (22) and (40), at first glance, appear highly non-convex. The non-convex nature comes from the fact that the functions $\mathcal{I}_{n,l}^{(J)}(\sigma, P_S(\cdot,\cdot), P_R(\cdot,\cdot), \Xi)$, with $J=\{R,D\}$, depending on $P_S(\cdot,\cdot)$, $P_R(\cdot,\cdot)$ and on $\alpha$, make the rates $R_l(\alpha, P_S(\cdot,\cdot), P_R(\cdot,\cdot))$, given through equations (24) through (27) (and consequently the cost function $-\mathcal{G}(R_1, \ldots, R_Q)$), non-convex in the variables $P_S(\cdot,\cdot)$, $P_R(\cdot,\cdot)$ and $\alpha$. Exploring a bit more the dependence from the instants vector $\alpha$ of $\mathcal{I}_{n,l}^{(J)}$ with $J=\{R,D\}$, it follows immediately, from equations (28) and (29), that its' dependence on $\alpha$ is through $\sigma$. In fact, $\sigma$ which defines the sets $\mathcal{S}_n$ and $\mathcal{R}_n$ in equations (30) and (31) is defined from $\alpha$ as in equation (4). In spite of their non-covex nature, the problems in equations (22) and (40) are structured enough to possess some suitable properties that will be illustrated in the following. Specifically, let $\mathcal{I}_{\cdot,\cdot} = \{\{\mathcal{I}_{l,n}^{(R)}, \mathcal{I}_{\ell,n}^{(D)}\}_{\ell=1}^{\mathcal{Q}}\}_{n=1}^{3\mathcal{Q}-1}$ denote the $(6\mathcal{Q}^2 - 2\mathcal{Q})$-dimensional array whose (n,l)-th entry corresponds to the functions $\mathcal{I}_{n,l}^{(J)}$ as defined in either equation (28) or equation (29). For every fixed value, $\bar{\mathcal{I}}_{\cdot,\cdot}$ of such $(6\mathcal{Q}^2-2\mathcal{Q})$-dimensional array, let $\Phi(\bar{\mathcal{I}}_{\cdot,\cdot})$ the set of all possible values of the vector of variables $[\alpha, P_S(\cdot,\cdot), P_R(\cdot,\cdot)]$ such that:

$$\Phi(\bar{\mathcal{I}}_{\cdot,\cdot}) = \{[\alpha, P_S(\cdot,\cdot), P_E(\cdot,\cdot)] : \mathcal{I}_{\cdot,\cdot}(\alpha, P_S(\cdot,\cdot), P_R(\cdot,\cdot)) = \bar{\mathcal{I}}_{n,l}$$
$$\forall n=1, \ldots, 3\mathcal{Q}-1, l=1, \ldots \mathcal{Q}\} \quad (46)$$

Then, it is immediate to verify that the mapping:

$$[\alpha, P_S(\cdot,\cdot), P_R(\cdot,\cdot)] \in \Phi(\bar{\mathcal{I}}_{\cdot,\cdot}) \mapsto R_l(\alpha, P_S(\cdot,\cdot), P_R(\cdot,\cdot))$$

is concave (linear) in $\alpha$ and concave in $P_S(\cdot,\cdot)$, $P_R(\cdot,\cdot)$ on $\Phi(\bar{\mathcal{I}}_{\cdot,\cdot})$, from which it follows that the cost function $-\mathcal{G}(R_1, \ldots, R_Q)$, that we want minimize, is convex in $[\alpha, P_S(\cdot,\cdot), P_R(\cdot,\cdot)]$ on $\Phi(\bar{\mathcal{I}}_{\cdot,\cdot})$. Furthermore, for every fixed permutation $\bar{\sigma}$ the function $\mathcal{I}_{n,l}(\bar{\sigma}, P_S(\cdot,\cdot), P_R(\cdot,\cdot), \Xi)$ is a linear function of $P_S(\cdot,\cdot)$, $P_R(\cdot,\cdot)$.

The two aforementioned interesting properties, possessed by the functions $\mathcal{I}_{n,l}$ and $-\mathcal{G}(R_1, \ldots, R_Q)$, make the optimization problems given in equations (22) and (40) part of a relevant subclass of non-convex global optimization problems, the partly convex problems (see Definition 1 below), which are some of the most suitable objects in modern optimization. In a general non-covex optimization problem, the distance of an algorithmic solution to the optimal solution can not be quantified. In contrast, for the partly convex problems given in equations (22) and (40), we are able to identify an algorithm which guarantees the convergence to the optimal solution within a given required precision.

In order to crisply illustrate and fully explore the partly convex property of the optimization problems given in equations (22) and (40), it is convenient to refer to the cost function, therein given, using a notation where the dependence on the all variables and functions explicitly appear.

To this end, it is useful noticing that set $\mathcal{V}$, given in equation (23), of all possible values of α, can be partitioned in the following sets:

$$\mathcal{V} \equiv \bigcup_{\sigma \in \Sigma_{3Q}} \mathcal{V}_\sigma$$

with:

$$\mathcal{V}_\sigma = \{\alpha \in [0\ 1]^{3Q} : \alpha_{\sigma(1)} \le \alpha_{\sigma(2)} \le \ldots \le \alpha_{\sigma(3Q)}, \alpha_{\sigma(i)} < \alpha_{\sigma(i+Q)} \le \alpha_{\sigma(i+2Q)}, \alpha_{\sigma(l)} = 0, \alpha_{\sigma(3Q)} = 1\}, \quad (47)$$

and $\mathcal{V}'_\sigma \cap \mathcal{V}''_\sigma = \emptyset$. From this consideration, it follows that the dependence of $-\mathcal{G}(R_1, \ldots, R_Q)$ from $\alpha \in \mathcal{V}$ can be decomposed in a dependence from $\sigma \in \Sigma_{3Q}$ and a further dependence from $\alpha_o \in \mathcal{V}_\ell$.

Based on all above considerations, in the following we refer to $-\mathcal{G}(R_1, \ldots, R_Q)$, using the following notation:

$$\mathcal{G}_{(\ldots,\ldots)}(R_1, \ldots, R_Q) = \mathcal{Q}(\sigma, \mathcal{I}^{(R)}_{\cdot,\cdot}, \mathcal{I}^{(D)}_{\cdot,\cdot}, \alpha_o, P_S(\ldots,\ldots), P_R) \quad (48)$$

where σ and $\alpha_o$ take values in $\Sigma_{3Q}$ and $\mathcal{V}$, respectively, while, for all J∈{S,R} n=1, ..., 3$\mathcal{Q}$ −1 and l=1, ..., $\mathcal{Q}$, $P_j(n,l) \in [0,P]$ and $\mathcal{I}_{n,\ell}^{(J)} \in \mathcal{V}_{\mathcal{I}_{n,\ell}^{(J)}}$ with:

$$\mathcal{V}_{\mathcal{I}_{n,\ell}^{(J)}} \equiv \left[0, \sum_{i \ne \ell} (|\gamma_{S,i}^{(J,\ell)}|^2 + |\gamma_{R,i}^{(J,\ell)}|^2)\right]. \quad (49)$$

In the following subsections, we first provide the necessary non-convex optimization background, notation and results (subsection III-A), mainly focusing on partly convex problems. Then, in subsections III-B and III-C, we will fully explore the notion of partly convex problem in order to derive an algorithm (interference coordination methodology of the invention) that, even though still exponentially complex in the number of interfering relays channels, is proved to converge in a finite number of steps, within an arbitrary small precision to the optimal resource allocations.

A. Partly Convex Optimization: Definition and Facts

In order to introduce the partly convex optimization problems, let us first introduce an special class of nonconvex global optimization problems given by:

$$\inf\{F(x,y)|G(x,y) \preceq 0, x \in \mathcal{X}, y \in \mathcal{Y}\} \quad (50)$$

where $\mathcal{X}$ is a compact convex subset of $\mathbb{R}^n$, $\mathcal{Y}$ a closed convex subset of $\mathbb{R}^p$, $F: \mathcal{X} \times \mathcal{Y} \to \mathbb{R}$, $G(x,y) = [G_1(x,y), \ldots, G_m(x,y)]$ is a vector-valued function $G: \mathcal{X} \times \mathcal{Y} \to \mathbb{R}^m$, K is a closed convex cone in $\mathbb{R}^m$ and $\preceq_K$ is the partial ordering in $\mathbb{R}^m$ induced by the cone K, i.e., such that $y \preceq_K y' \leftrightarrow y' - y \in K$.

An important subclass of this class of problems is constituted by the partly convex problems which are problems given by equation (50) with the following additional assumptions:

Definition 1 The nonconvex global optimization problem in equation (50) is a partly convex problem if, for every fixed x∈X, the function y→F(x,y) is convex, while the mapping y→G(x,y) is K-convex. For every fixed x, a mapping y→G(x;y) is K-convex if $G(x; \alpha y_1 + (1-\alpha) y_2) \preceq_K \alpha G(x; y_1) + (1-\alpha) G(x; y_2)$ whenever $y_1, y_2 \in \mathbb{R}^p$ and α∈0,1].

In general, computationally efficient techniques for solving problems as in equation (50) can not be found. Although general purpose global optimization algorithms can be applied, the computational cost is often an exponential function of the number of decision variables and, furthermore, it is not possible, in general, to quantify how close the algorithmic solution is to the optimal solution. To overcome the use of computationally intensive algorithms, a convex relaxation of a non-convex problem is obtained by removing non-convex constraints or replacing them with necessary (but generally not equivalent) convex constraints, hence simplifying and enlarging the set over which the optimization is carried out.

1) Branch and Bound Decomposition: Facts and Definitions

Branch and bound algorithms can be used for global optimization in non-convex problems. They are nonheuristic in the sense that they maintain a provable upper and lower bound on the (globally) optimal objective value; they terminate with a certificate proving that the suboptimal point found is ε-suboptimal.

A branch-and-bound procedure employs two tools: the branching and the bounding. The former is a splitting procedure that partitions the feasible set into convex sets, the latter is a bounding procedure to compute upper and lower bounds of the desired function over a given one of these convex sets.

A branch and bound procedure proceeds typically as follows. Referring to the general non-covex problem in equation (50), the branch and bound procedure starts from $\mathcal{A}^{(0)} \equiv \mathcal{X} \times \mathcal{Y}$ and selects an exhaustive subdivision rule. Let $\mathcal{U}^{(0)}$ be an upper bound to F(x,y) over the feasible solutions. At the iteration k, we arrive with a collection of k convex sets (partition sets), $\{\mathcal{A}^{(k)}_j\}_{j=1}^k$, such that:

$$x \times y \equiv \bigcup_{j=1}^k \mathcal{A}_j^{(k)}.$$

For each partition set, $\mathcal{A}_j^{(k)}$, a lower bound, $\mathcal{L}_j^{(k)}$, and an upper bound, $\mathcal{U}_j^{(k)}$, to $\inf\{F(x,y)|G(x,y) \preceq_k 0, (x,y) \in \mathcal{A}_j^{(k)}\}$ are computed, and assigned to such partition set. This step is called bounding.

The next steps are:
selecting the partition set, for example, $\mathcal{A}_{j^*}^{(k)}$, with the minimum lower bound,
subdividing it into $\mathcal{A}_{j^*}^{(k)} \equiv \mathcal{A}_{j^*1}^{(k)} \cup \mathcal{A}_{j^*2}^{(k)}$ according to the chosen subdivision rule.

In this way a new partition of $\mathcal{X} \times \mathcal{Y}$ with k+1 convex sets is defined such that:

$$x \times y \equiv \left(\bigcup_{j \ne j^*}^k \mathcal{A}_j^{(k)}\right) \cup \mathcal{A}_{j_1^*}^{(k)} \cup \mathcal{A}_{j_2^*}^{(k)}.$$

This step is called branching, since its recursive application defines a tree structure (the search tree) whose nodes are the partition sets of $\mathcal{X} \times \mathcal{Y}$. It is clear that in the branching process described above, the number of sets in the current partition is equal to the number of iterations. However, often some of such sets may be pruned. In fact, if the lower bound for some set, $\mathcal{A}_{j^*}^{(k)}$, in the current partition, is greater than the upper bound for some other set, then $\mathcal{A}_{j^*}^{(k)}$ may be safely discarded from the search since the minimum cannot be achieved in it. This step is called pruning. Though pruning is not necessary for the algorithm to work, it does reduce storage requirements.

The capability of the branch and bound method to converge to the optimal solution is strictly connected to the non-trivial nature and to the quality of the upper and lower bound, over a given region, to the function we want to minimize: an extreme case of trivial lower bound is represented by a lower bound which turns out to be equal over all partitions $\{\mathcal{A}_j^{(k)}\}$. At the same time, the computational efficiency of the branch and bound method depends strongly on the node-splitting procedure and on the possibility of finding subroutines that (efficiently) compute non-trivial lower and an upper bound: the upper bound can be found by choosing any point in the region, or by a local optimization method; the lower bound can be found from convex relaxation, duality, Lipschitz, or other bounds.

If non-trivial lower bounds and upper bounds as well as efficient subroutines for their evaluation are identified, then, as the number of the iterations, k, diverges, the branch and bound decomposition generates, asymptotically, a partition of $\mathcal{X} \times \mathcal{Y}$ such that the smallest subset of such partition shrink asymptotically to a point. Let such point be denoted by $(x^*, y^*)$. A sufficient condition for $(x^*, y^*)$ being the optimal solution to equation (50) is that the lower and the upper bounds evaluated at $(x^*, y^*)$ coincide, which broadly speaking, is equivalent to say that the lower and the upper bounds over a given convex set in the partition become sharper when such set shrinks to a point. This consideration is stated in a more formal way by the following definitions and theorem:

Definition 2: We say that a branch and bound algorithm converges, at a given iteration, if the minimum lower bound over all possible sets of the partition coincides with one of upper bounds associated to the partition sets.

Definition 3: We say that a branch and bound algorithm converges within a given precision $\epsilon$, at a given iteration, if the difference between the minimum lower bound over all partition sets and the minimum upper bound over partition sets is less then $\epsilon$.

Theorem 1: The branch and bound algorithm converges provided the bound functions satisfy the following condition:
For all subset $\mathcal{A}_j^{(k)} \subset X \times Y$ $$\mathcal{L} \leq \inf\{F(x,y)|G(x,y) \preceq 0, (x,y) \in \mathcal{A}\} \leq \mathcal{U}$$

$\forall \epsilon > 0, \exists \delta$ such that (the size, Size (A), of a set $\mathcal{A}$ is, here, defined as the maximum half-length of the sides of the smallest rectangle, $\mathcal{Q}$, containing $\mathcal{A}$):

$$\forall \mathcal{A}_j^{(k)} \mathcal{X} \times \mathcal{Y}, \text{Size}(\mathcal{A}) \leq \delta \Rightarrow \mathcal{U} - \mathcal{L} \leq \epsilon.$$

In many cases of interest, however, the non-convex optimization problem is so structured that the partly convex property (as defined in Definition 1) holds. For this class of non-convex optimization problems, two effective mechanisms can be conveniently applied in order to make the branch and bound algorithm more computationally efficient. The first one comprises performing the branch and bound decomposition with branching conducted only in the x-space, $\mathcal{X}$, according to an exhaustive rectangular successive subdivision rule (e.g., the standard bisection rule), while the set $\mathcal{Y}$ is not subject to any partition. In this case, the set $\mathcal{X} \times \mathcal{Y}$, where the minimization is performed, is partitioned into convex sets given by $\mathcal{A}_j^{(k)} \equiv \mathcal{F}_j^{(k)} \times Y$ with $X \equiv \cup_{j-1}^k \mathcal{F}_j^{(k)}$ and $\mathcal{A}_j^{(k)} \cap \mathcal{A}_j^{(k)} \equiv \emptyset$.

The second mechanism relies on computing the lower bounds of the function that we want to minimize, resorting to the Lagrangian dual problem. We refer to those bounds as Lagrangian bounds. Specifically, for the non-convex optimization problem as defined in Defintion 1, the lower bound is computed solving the following Lagrangian dual problem:

$$\sup_{\lambda \in K^*} \inf \{F(x,y) + \langle \lambda, G(x,y) \rangle \mid x \in \mathcal{F}_j^{(k)}, y \in \mathcal{Y}\} \tag{51}$$

where $K^* \equiv \{\lambda \in \mathbb{R}^m | \langle \lambda, u \rangle \geq 0 \ \forall u \in K\}$ is the dual cone of K.

Note that, from the partly convex property, for every $\lambda \in K^*$ and fixed $\bar{x} \in \mathcal{F}_j^{(k)}$, the function $\langle \lambda, G(x,y) \rangle$ is convex and the problem:

$$\theta(x,\lambda) = \inf\{F(\bar{x},y) + \langle \lambda, G_c(x,y) \rangle \mid y \in Y\} \tag{52}$$

is a convex optimization problem which can be efficiently solved with interior-point methods. Once equation (52) is solved, computing equation (51) becomes computing:

$$\sup_{\lambda \in K^*} \inf_{x \in \mathcal{F}_j^{(k)}} \theta(x, \lambda) \tag{53}$$

In equation (53), the sup over $\lambda \in K^*$ is easy since $$\inf_{x \in \mathcal{F}_j^{(k)}}$$

$\theta(x,\lambda)$ is the pointwise supremum of a set of affine functions in $\lambda$. In contrast, finding the infimum of $\theta(x,\lambda)$, over $x \in \mathcal{F}_j^{(k)}$, in an efficient way, depends on the functions $F(x,y)$ and $G(x,y)$ and it could be still $\theta(x,\lambda)$ very complicated. Consequently some approximation and relaxations could be desired.

Equation (53) can be proven a lower bound to the function we want to minimize over the set $\mathcal{F}_j^{(k)} \times \mathcal{Y}$ i.e.,:

$$\sup_{\lambda \in K^*} \inf_{x \in \mathcal{F}_j^{(k)}} \theta(x, \lambda) \leq \inf\{F(x, y) \mid G(x, y) \preceq_K 0, \tag{54}$$

$$x \in \mathcal{F}_j^{(k)}, y \in Y\}$$

where the equality holds if and only if zero-gap duality is guaranteed.

At this point, a question that arises is under which condition the branch and bound decomposition method with Lagrangian bounds converges in the sense of Definitions 2 and/or 3. Sufficient conditions on the functions $F(x,y)$ and $G(x,y)$ can be found that guarantee the convergence of the branch and bound decomposition with Lagrangian bounds. Of course, notice that if one could solve equation (54) exactly and zero-gap duality is guaranteed for all sets $\mathcal{F}_j^{(k)} \times \mathcal{Y}$ defining the subproblems given equation (54), then the convergence of the branch and bound decomposition is immediate. Thus, we summarize the following results as Theorem 2:

Theorem 2: Assume that the functions, $F(x,y)$ and $G_i(x,y)$ with $i=1 \ldots, m$, in (1), are lower semi-continuous on $\mathcal{X} \times \mathcal{Y}$ and continuous in x for fixed $y \in \mathcal{Y}$. If, furthermore, there exists a $\lambda^* \in K^*$ such that the function $F(\bar{x},y) + \langle \lambda, G(\bar{x},y) \rangle$ is coercive (a function $f: \mathcal{Y} \mapsto \mathbb{R}$ is said to be coercive on Y if $\lim_{y \in \mathcal{Y} ||y|| \to \infty} f(y) = +\infty$; clearly this is equivalent to saying that for any $\eta \in \mathbb{R}$ the set $\{y \in \mathcal{Y} | f(y) \leq \eta\}$ is bounded) on $\mathcal{Y}$, then the branch and bound decomposition algorithm using Lagrangian bounds is convergent.

In the following, we will apply all the definitions and property explored in this section to the non-convex optimization problems given in equations (22) and (40). Specifically, we will first prove that the aforementioned non-convex optimization problems can be reformulated in an equivalent partly convex optimization problems and later we give a computationally efficient searching algorithms for finding the solutions to the optimization problem based on the branch and bound approach with Lagrangian bounds.

B. Algorithmic Solutions

This section will give an equivalent formulation of the optimization problems in equations (22) and (40), prove some properties of the functions in equations (22) and (40), and show that the branch and bound decomposition approach using Lagrangian bounds, applied to the foregoing optimization problems, converges to their global minimum and consequently represents an advantageous technique in finding the optimum solution of our optimization problems. It is worth recalling that this method naturally lends itself to parallel and distributed implementations in computing the upper and the lower bounds.

C. Branch and Bound Decomposition for the Case of Perfect or Partial CSI

Based on the considerations and notations illustrated at the beginning of section III above, in the following subsection we will focus on the optimization problem given in equation (22). The same considerations hold for the optimization problem given in equation (40) as summarized in subsection III-D. Based on the consideration made in the previous subsection, we state the following theorem:

Theorem 3: The optimization problem given in equation (22) is equivalent to the following optimization problem:

$$\min_{\sigma} \min_{i^R_{.,.},i^D_{.,.}} \min_{\alpha_\sigma} \min_{P_S(\cdot,\cdot),P_R(\cdot,\cdot)} \mathcal{Q}(\sigma, i^R_{.,.}, i^D_{.,.}, \alpha_\sigma, P_S(\cdot,\cdot), P_R(\cdot,\cdot),) \quad (55)$$

subject to $$\begin{cases} \alpha_{\sigma(2q)} = 1 \\ P_S(\ell, n) \leq P, P_R(\ell, n) \leq P \quad \ell = 1, \ldots \mathcal{Q}, n = 1, \ldots, 3\mathcal{Q}-1 \\ \mathcal{I}^R_{\ell,n}(\sigma, P_S(\cdot,\cdot), P_R(\cdot,\cdot)) = i^R_{\ell,n} \quad \ell = 1, \ldots \mathcal{Q}, n = 1, \ldots, 3\mathcal{Q}-1 \\ \mathcal{I}^D_{\ell,n}(\sigma, P_S(\cdot,\cdot), P_R(\cdot,\cdot)) = i^D_{\ell,n} \quad \ell = 1, \ldots \mathcal{Q}, n = 1, \ldots, 3\mathcal{Q}-1 \end{cases}$$

where minimum is searched over all possible values of $[\sigma, i^R_{.,.}, i^D_{.,.}, \alpha_\sigma, P_R(.,.), P_S(.,.)]$ taking values in: $\sigma \in \Sigma_{3\mathcal{Q}}$, $P_S(l,n) \in [0P]$, $P_R(l,n) \in [0P]$, $\alpha_\sigma \in \mathcal{V}_\sigma$, and finally:

$$i_{l,n}^J \in \mathcal{V}_{\mathcal{I}^{(n)}_{n,\ell}}, J=\{R,D\},$$

with $\mathcal{V}_\sigma$ given in equation (47) and $\mathcal{V}_{\mathcal{I}^{(n)}_{n,\ell}}$ given in equation (49).

Furthermore, in equation (55), the following conditions are satisfied:

$\mathcal{Q}(\sigma, i^R_{.,.}, i^D_{.,.}, \alpha_\sigma, P_S(.,.), P_R(.,.),)$ is:
  lower semi-continuous with respect to $\alpha_\sigma, P_S(.,.), P_R(.,.)$, $i^R_{.,.}$, and $i^D_{.,.}$;
  continuous in $i^R_{.,.}$ and $i^D_{.,.}$ for fixed $\sigma$, $\alpha_\sigma$, $P_S(.,.)$, and $P_R(.,.)$;
  concave function of $\alpha_\sigma, P_S(.,.), P_R(.,.)$, for every fixed $\sigma \in \Sigma_{3\mathcal{Q}}$ and for every fixed $i^R_{n,l}$, and $i^D_{n,l}$ with $l=1, \ldots \mathcal{Q}$, $n=1, \ldots, 3\mathcal{Q}-1$,
  concave function of $i^R_{.,.}$ and $i^D_{.,.}$, for every fixed $\sigma$, $\alpha_\sigma$, $P_S(.,.)$, and $P_R(.,.)$.

for every fixed $\sigma \in \Sigma_{3\mathcal{Q}}$, $\mathcal{I}_J = (P_S(.,.), P_R(.,.))$ is a real linear scalar function of its arguments and consequently is K-convex with respect to $P_S(.,.), P_R(.,.)$.

For each fixed $\bar\sigma \in \Sigma_{3\mathcal{Q}}$, let us consider the sub-problem obtained from equation (55) when $\sigma$ is set equal $\bar\sigma$. Making a parallel between such sub-problem and the optimization problem given in equation (50), we can set:

the vector x equals to the vector of variables V, $i^R_{.,.}, i^D_{.,.}$],
the vector y equals to the vector of variables $[\alpha_{\bar\sigma,PS}(.,.), P_R(.,.)]$
the set $\mathcal{X}$ with the $(6\mathcal{Q}^2-2\mathcal{Q})$-dimensional rectangle given by the cartesian product of the 2-dimensional rectangle $\mathcal{V}_{\mathcal{I}^{(n)}_{n,\ell}} \times \mathcal{V}_{\mathcal{I}^{(n)}_{n,\ell}}$ for all $n=1, \ldots, 3\mathcal{Q}-1$ and $l=1, \ldots, \mathcal{Q}$;
the set $\mathcal{Y}$ equal to: $\mathcal{Y} \equiv [0,1]^{3\mathcal{Q}} \times [0,P]^{(6\mathcal{Q}^2-2\mathcal{Q})}$;
and finally $\mathcal{G}(x,y)$ equals to the vector-valued function obtained counting for the all constraints in equation (55).

Given this parallelism and from Theorem 3, it is immediate to see that each of the sub-problems that can be derived from equation (55) setting $\sigma$ equals to a specific value, is a partly convex optimization problem where the assumption required in Theorem 2 are satisfied. Consequently, a branch and bound decomposition algorithm with Lagrange bounds, applied to each of such sub-problems, will converge to the optimum solution as the number of iterations increases.

In the following, we describe a illustrative algorithmic implementation of the branch and bound decomposition. In the subsequent description: k stands for the iteration index, $\mathcal{L}_{Global}^{(k)}$ denotes the global lower bound and $\mathcal{U}_{Global}^{(k)}$ denotes the global upper bound to:

$$\min\{\mathcal{G}(\bar\rho,x,y)| \mathcal{G}(\bar\sigma,x,y) \preceq 0 x \in \mathcal{X}, y \in \mathcal{Y}\},$$

at the end of the k iteration. It is to be understood that the following branch and bound algorithm is an example of the methodology 20 described above in the context of FIG. 2 (wherein step 28 is the branch process and step 26 is the bound process).

Branch and bound algorithm.

Fix a $\bar\sigma \in \Sigma_{3\mathcal{Q}}$, , and set:
  k=0;
  the vector x equal to the vector of variables $[i^R_{.,.}, i^D_{.,.}]$,
  the vector y equal to the vector of variables $[\alpha_{\bar\sigma}, P_S(.,.), P_R(.,.)]$,
  the set $\mathcal{X}$ equal to the $(6\mathcal{Q}^2-2\mathcal{Q})$-dimensional rectangle given by the cartesian product of the 2-dimensional rectangle $\mathcal{V}_{\mathcal{I}^{(n)}_{n,\ell}} \times \mathcal{V}_{\mathcal{I}^{(n)}_{n,\ell}}$ for all $n=1, \ldots, 3\mathcal{Q}-1$ and $l=1, \ldots, \mathcal{Q}$;
  the set $\mathcal{Y}$ equal to: $\mathcal{Y} \equiv [0,1]^{3\mathcal{Q}} \times [0, P]^{(6\mathcal{Q}^2-2\mathcal{Q})}$;
  $\mathcal{G}(x,y)$ equals the vector-valued function obtained counting for all the constraints in equation (55).
  $\mathcal{F}^{(0)} = \mathcal{X}$;
  $\mathcal{A}^{(0)} = \mathcal{X} \times \mathcal{Y}$;
  $\mathcal{L}_{Global}^{(0)} = \sup_{\lambda \in K^*} \min\{\mathcal{Q}(\bar\sigma,x,y) - \langle G(x,y)\rangle | x \in \mathcal{X}, y \in \mathcal{Y}\}$;
  $\mathcal{U}_{Global}^{(0)} = \mathcal{Q}(\bar\sigma, \overline{xy})$ with $(\bar x, \bar y)$ any point in x×y;
while $\mathcal{U}_{Global}^{(k)} - \mathcal{L}_{Global}^{(k)} > \epsilon$
  pick $\mathcal{A}_j^{(k)} \in \mathcal{A}^{(k)}$ such that $\mathcal{L}_j^{(k)} = \mathcal{L}_{Global}^{(k)}$;
  split $\mathcal{F}_j^{(k)}$ along one of its longest edges (splitting the chosen rectangle along a longest edge controls the convergence of the branch and bound algorithm) into $\mathcal{F}_{j,1}^{(k)}$ and $\mathcal{F}_{j,2}^{(k)}$;
  form $\mathcal{F}^{(k+1)} = \{\mathcal{F}^{(k+1)}, \ldots, \mathcal{F}_{k+1}^{(k+1)}\}$ from $\mathcal{F}^{(k)}$ by removing $\mathcal{F}^{(k)}$ and adding $\mathcal{F}_{j,1}^{(k)}$ and $\mathcal{F}_{j,2}^{(k)}$
  set $\mathcal{A}^{(k+1)} = \{\mathcal{A}^{(k+1)}, \ldots, \mathcal{A}_{k+1}^{(k+1)}\}$ with $\mathcal{A}^{(k+1)} = \mathcal{F}^{(k+1)} \times \mathcal{Y}$ with $j=1, \ldots, k+1$;
  set $\mathcal{L}^{(k+1)} = \sup_{\lambda \in K^*} \min\ \{\mathcal{Q}(\bar\sigma,x,y) - \langle G(x,y)\rangle | x \in \mathcal{F}^{(k+1)}, y \in \mathcal{Y}\}$;
  $\mathcal{U}^{(k+1)} = \mathcal{Q}(\bar\sigma, \bar x, \bar y)$ with $\bar x \in \mathcal{F}^{(k+1)}$ and $\bar y \in \mathcal{Y}$;
  k=k+1;

Being more explicit with the notation $\sup_{\lambda \in K^*} \min\{\mathcal{Q}(\bar{\sigma},x,y) - \langle \lambda, G(x,y)\rangle \, | x \in \mathcal{F}^{(k+1)}, y \in \mathcal{Y}\}$ we mean:

$$\sup_{\lambda \in K^*} \min\{\theta(\lambda, \bar{\sigma}, x) \, | \, x \in \mathcal{F}_j^{(k+1)}\}$$

with $\theta(\lambda,x)$ given by the following dual convex problem:

$$\theta(\lambda, x) = \min_{y \in \mathcal{Y}} \left\{ \begin{array}{l} \mathcal{Q}(\bar{\sigma}, x, \alpha_\sigma, P_S(.,.), P_R(.,.),) - \sum_{\ell,n} \lambda_{\ell,n}(P_S(\ell, n) - P) \\ - \sum_{\ell,n} \tilde{\lambda}_{\ell,n}(P_R(\ell, n) - P) - \bar{\lambda}(\alpha_{\sigma(3Q)} - 1) - \hat{\lambda}\alpha_{\sigma(1)} \end{array} \right\}$$

where as usual $x = [\mathbf{i}_{.,.}^R, \mathbf{i}_{.,.}^D]$.

The minimum with respect to $x = [\mathbf{i}_{.,.}^R, \mathbf{i}_{.,.}^D]$ on $\mathcal{F}^{(k+1)}$ can be found observing that $\theta(\lambda,x)$ is a concave function on a compact convex set, and thus its minimum is achieved at an extreme point of the set. Consequently denoting by $x = [\bar{\mathbf{i}}_{.,.}^R, \bar{\mathbf{i}}_{.,.}^D]$ one of such points, we compute:

$$\theta^*(x) = \sup_{\lambda \in K^*} \min_{y \in \mathcal{Y}} \left\{ \begin{array}{l} \mathcal{Q}(\bar{\sigma}, x, \alpha_\sigma, P_S(.,.), P_R(.,.),) - \sum_{\ell,n} \lambda_{\ell,n}(P_S(\ell, n) - P) \\ - \sum_{\ell,n} \bar{\lambda}_{\ell,n}(P_R(\ell, n) - P) - \bar{\lambda}(\alpha_{\sigma(3Q)} - 1) - \hat{\lambda}\alpha_{\sigma(1)} \end{array} \right\}$$

which can be solve efficiently since it is a dual convex problem using interior-point methods, and then we choose the minimum over all possible extreme points $\bar{x}$, i.e., $$\mathcal{L}_j^{(k+1)} = \min_{\bar{x}}\{\theta^*(\bar{x})\}$$

The upper bound can be found choosing any point in the region or using a local optimization method (as mentioned at the beginning of the subsection).

D. Branch and Bound Decomposition for Statistical CSI at the Transmitter

In this subsection, we state the results found in the previous section for the case that the resource power allocation is optimized based on statistical CSI available at the transmitter. Specifically, we have that:

Theorem 4: The optimization problem given in equation (40) is equivalent to the following optimization problem:

$$\min_{\sigma}\min_{\alpha_\sigma}\min_{P_S(\cdot,\cdot),P_R(\cdot,\cdot)} \mathbb{E}\left[\min_{i_{.,.}^R, i_{.,.}^D}\mathcal{Q}(\sigma, i_{.,.}^R, i_{.,.}^D, \alpha_\sigma, P_S(\cdot,\cdot), P_R(\cdot,\cdot),)\right] \quad (56)$$

subject to $$\left\{\begin{array}{l} \alpha_{\sigma(2q)} = 1 \\ P_S(l,n) \leq P, P_R(l,n) \leq P \quad \begin{array}{l} l = 1, \ldots \mathcal{Q}, \\ n = 1, \ldots, 3\mathcal{Q} - 1 \end{array} \\ \mathcal{L}_{l,n}^R(\sigma, P_S(\cdot,\cdot), P_R(\cdot,\cdot)) = i_{l,n}^R \quad \begin{array}{l} l = 1, \ldots \mathcal{Q}, \\ n = 1, \ldots, 3\mathcal{Q} - 1 \end{array} \\ \mathcal{L}_{l,n}^D(\sigma, P_S(\cdot,\cdot), P_R(\cdot,\cdot)) = i_{l,n}^D \quad \begin{array}{l} l = 1, \ldots \mathcal{Q}, \\ n = 1, \ldots, 3\mathcal{Q} - 1 \end{array} \end{array}\right.$$

where all the quantities in the aforementioned optimization problem are defined as in Theorem 3 while the expectation is with respect the joint distribution of the random vector $\Xi$ defined in equation (6).

Everything stated in subsection III-B and in section III-C for the optimization problem illustrated by equation (22) holds for the optimization problem given in equation (40) simply replacing $$\min_{i_{.,.}^R, i_{.,.}^D} \mathcal{Q}(\sigma, \alpha_\sigma, P_S(\cdot,\cdot), P_R(\cdot,\cdot), i_{.,.}^R, i_{.,.}^D)$$

with its expected values with respect to the distribution of the random fading vector $\Xi$ i.e., $$\mathbb{E}\left[\min_{i_{.,.}^R, i_{.,.}^D} \mathcal{Q}(\sigma, \alpha_\sigma, P_S(\cdot,\cdot), P_R(\cdot,\cdot), i_{.,.}^R, i_{.,.}^D)\right].$$

The only aspect of the previous analysis that needs further explanation is the computation of the lower bound. Again, given the partial convex nature of the problem, using the property that $\mathcal{Q}(\sigma, \alpha_o, P_S(.,.), P_R(.,.), i_{.,.}^R, i_{.,.}^D)$ is a convex function of $i_{.,.}^R, i_{.,.}^D$ and consequently that the minimum, on a compact convex set, is achieved at the extreme points of the set, we have that the lower bound can be computed first solving for a given extreme point $x = [\bar{\mathbf{i}}_{.,.}^R, \bar{\mathbf{i}}_{.,.}^D] \in \mathcal{F}^{(k+1)}$ the following dual convex problem:

$$\mathcal{L}(\bar{\sigma}, \bar{i}_{(\cdot)}) = \min \quad (57)$$

$$\left\{ \mathbb{E}[\mathcal{Q}(\bar{\sigma}, \alpha_\sigma, P_S(\cdot,\cdot), P_R(\cdot,\cdot), \bar{i}_{(\cdot)})] - \sum_l \sum_n \lambda_{l,n}(P_S(l,n) - P) - \sum_l \sum_n \tilde{\lambda}_{l,n}(P_R(l,n) - P) - \bar{\lambda}(\alpha_{2\ell} - 1) \right\}$$

and then taking the minimum over all extreme points.

Figure 5:
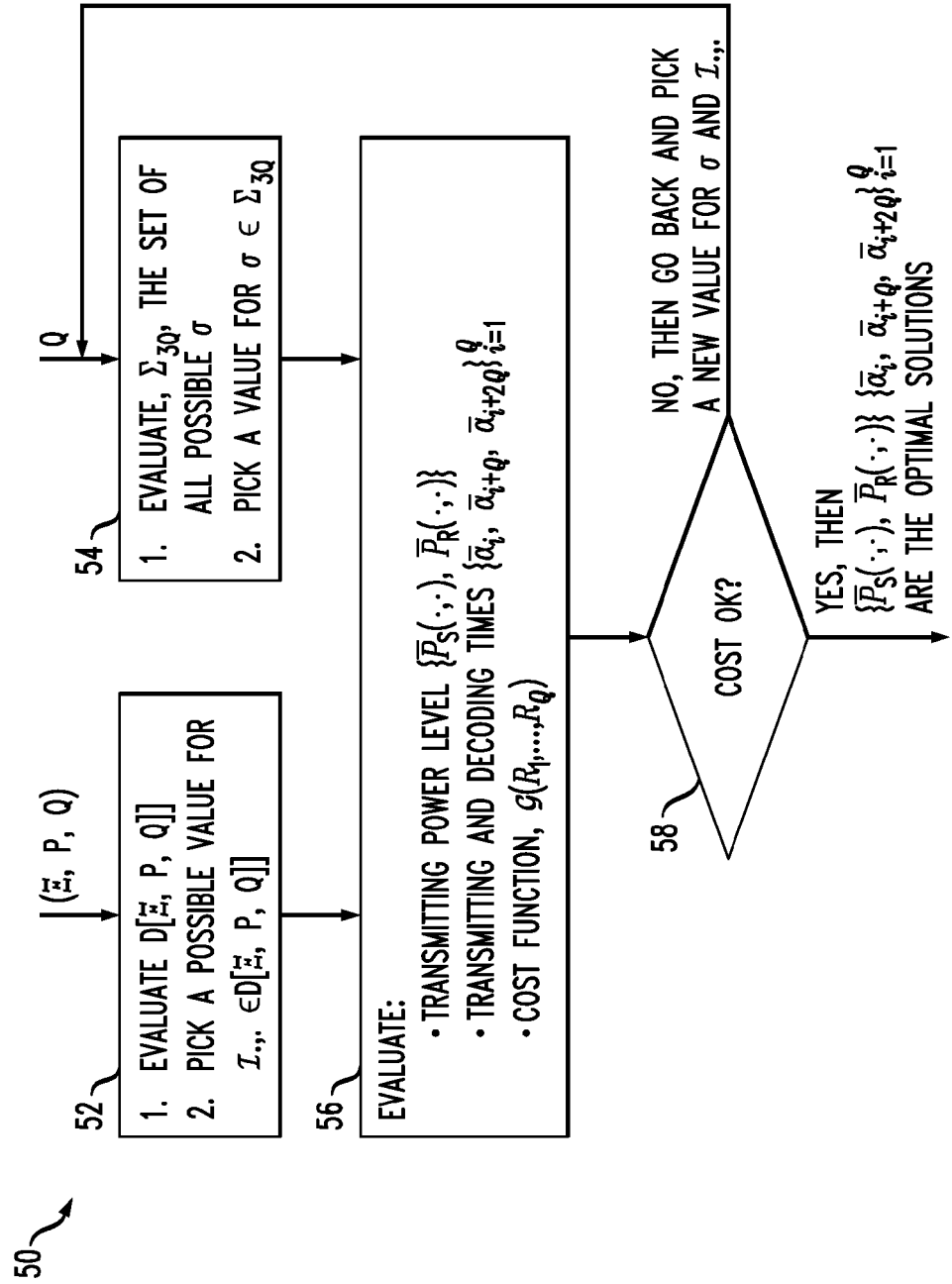
FIG. 5 is a flow diagram illustrating an interference coordination methodology according to an embodiment of the invention.

Before moving on to a numerical analysis of the inventive algorithms of the invention, reference is made to FIG. 5. Given the above derivations of the optimization problems and algorithmic solutions, FIG. 5 summarizes an embodiment of the interference coordination methodology according to the invention presented in the context of the notations given in sections II and III.

Therefore, in the context of methodology 50 as shown in FIG. 5, assume:

2Q=number of mutually interfering sources and relays;

σ=possible ordering of all transmitting and decoding time. $\sigma \in \Sigma_{3Q}$ (see equation (4));

$\Xi = Q(4Q\_1)$-dimensional random vector whose elements count for the fading coefficient that characterize all the possible communication links between all the transmitting (source and relays) and all receiving nodes (relays and destinations);

P=power constraints on the sources and on the relays;

$D(\Xi, P, Q) = 2Q(3Q-1)$-dimensional rectangle wherein the interfering levels (see equations (28) and (29)) take values. This means that the interference, based on the channel realization of the several links and based on the possible range of transmitting values, will have a possible range of values. This range of possible values is described by a multidimensional rectangle denoted by $D(\Xi, P, Q)$.

Further, in the methodology 50 of FIG. 5, we denote by:

$$\mathcal{I} = \{\{\mathcal{I}, \mathcal{I}_{\ell,n}^{(D)}\}_{\ell=1}^Q\}_{n=1}^{3Q-1}$$

the 2Q(3Q-1)-dimensional array whose (n, l)-th entry corresponds to the functions as defined in either in equation (28) or in equation (29).

Thus, in step 52, the methodology evaluates D(Ξ, P, Q), and picks a potential value for I.,. as a subset of D(Ξ, P, Q). In step 54, the methodology evaluates, $\Sigma_{3Q}$, the set of all possible σ, and picks a value for $\sigma \in \Sigma_{3Q}$.

Then, in step 56, the methodology evaluates:

Transmitting power level $\{\overline{P}_S(.,.), \overline{P}_R(.,.)\}$

Transmitting & Decoding Times $\{\overline{\alpha}_i, \overline{\alpha}_{i+Q}, \overline{\alpha}_{i+2Q}\}_{i=1}^Q$ Cost function. $\mathcal{G}(R_1, \ldots, R_Q)$ If, in step 58, the cost is not acceptable, then the methodology goes back and picks a new value for σ and $\mathcal{I}$.,... If, however, the cost is acceptable, then $\{\overline{P}_S(.,.), \overline{P}_R(.,.)\}$ $\{\overline{\alpha}_i, \overline{\alpha}_{i+Q}, \overline{\alpha}_{i+2Q}\}_{i=1}^Q$ are considered the optimal solutions.

IV. Numerical Analysis

A general framework for solving optimizations problems in the form of equations (22) and (40) are provided in section III-C. As a global method that uses the Lagrangian bounds, the worst case computational complexity of the branch and bound algorithm increases at least exponentially in the numbers of interfering one-relay channels. In practice, it can be observed that computing the globally optimal solutions is practically feasible for a small to moderate number of one-relay channels (e.g., $\mathcal{Q} \leq 7$). Moreover, as the number of one-relay channels that we want to joint optimize increases, the computational complexity of the branching (splitting) procedure limits the applicability of the framework to off-line computation. Nevertheless, by using global methods, it is possible to compute the ultimate performance bounds for a given system configuration and a corresponding interference management strategy which is guaranteed to be globally optimal.

In the subsequent subsections, we provide a numerical evaluation of the performance achieved by an interference relay network with multiple mutually interfering one-relay channels where the resource allocations are optimized based on the criteria described in section II-C. Specifically, in our numerical evaluations, we focus on the case where partial CSI is available at the transmitting nodes, i.e., the transmitting nodes only have knowledge of the amplitude of the fading coefficients, which is the most relevant scenario for the current communications systems.

As already mentioned above, using the algorithm described in section III-C, we could solve the optimization problems given by equation (22). However, the complexity of such an algorithm could limit its real-time implementation in the context of cellular systems. Thus, we assume some constraints on the scenario that we are going to consider, which inevitably brings some sub-optimality in the values of the network variables α, $P_S(.,.)$ and $P_R(.,.)$ that we employ. Specifically, we consider two different simplified scenarios:

Interference Coordination (IC) algorithm with No-Power-Optimization: In this scenario, we do not optimize the transmit powers $P_S(.,.)$ and $P_R(.,.)$. Moreover, we set $\alpha_i=0$ for all $i=1, \ldots, \mathcal{Q}$ which implies that all the sources start transmitting together and we set $P_S(l,n)=P$, where P is the constrained power level, until the destination gets the message. Furthermore, we set $P_R(l,n)=P$ only when the relay of l-th one-relay channel is activated and this value P persists until the destination gets the message.

IC algorithm with On-Off-Power-Optimization: In this scenario, as in the general formulation given in section II-B, $\alpha_i < \alpha_{i+Q} \leq \alpha_{i+2Q}$ for all $i=1, \ldots, \mathcal{Q}$ take value in [0,1]. However, in this setting, we optimize the transmit powers $P_S(.,.)$ and $P_R(.,.)$ only allowing two possible values for transmit powers: $P_S(l,n) \in \{0,P\}$ and $P_R(l,n) \in \{0,P\}$ for all $n=1, \ldots, 2\mathcal{Q}$ and $l=1, \ldots, \mathcal{Q}$.

The first scenario leads us to an optimization problem covered by equation (22) with: the rates $R'_l$ and $\hat{R}_l$ defined as in equations (26) and (27), $P_S(l,n)$ and $P_R(l,n)$ set equal to P whenever transmission is taking place, and finally $\alpha_i=0$ for all $i=1, \ldots, \mathcal{Q}$.

The second scenario culminates in an optimization problem covered by equation (22) with the rates $R'_l$ and $\hat{R}_l$ defined as in equations (26) and (27), with $P_S(l,n)$ and $P_R(l,n)$ taking values in the discrete set $\{0,P\}$ and finally with all the sources starting transmitting together i.e. $\alpha_i=0$ for all $i=1, \ldots, \mathcal{Q}$. Note that, in this case, the algorithm suggested in section III-C can not be applied any more since for each fixed $\overline{\sigma} \in \Sigma_{3Q}$, the sub-problem obtained from equation (55) when σ is set equal to $\overline{\sigma}$, is not a partly convex problem any more. However, in this case, the problem admits an equivalent LP-optimization reformulation in $2^{2Q}-1$ variables and its complexity is exponential in $2\mathcal{Q}$.

For each of the above simplified scenarios, we quantify performance of the resulting IC schemes which are covered by the above non-convex optimization procedures.

We, also, consider two different interference relay networks. The first one, which we refer to as isolated coordination cluster, analyzed in section IV-A, consists of $\mathcal{Q}=3$ mutually interfering relay channels, with the three sources of each relay channel placed alternatively in the three corners of a hexagon as in FIG. 3 and the users placed uniformly inside the hexagon. The resource allocation is obtained in this case solving equation (22) with the rates $R'_l$ and $\hat{R}_l$ given as in equations (26) and (27) setting $P_S(l,n)=P$ and $P_R(l,n)=P$.

Figure 6:
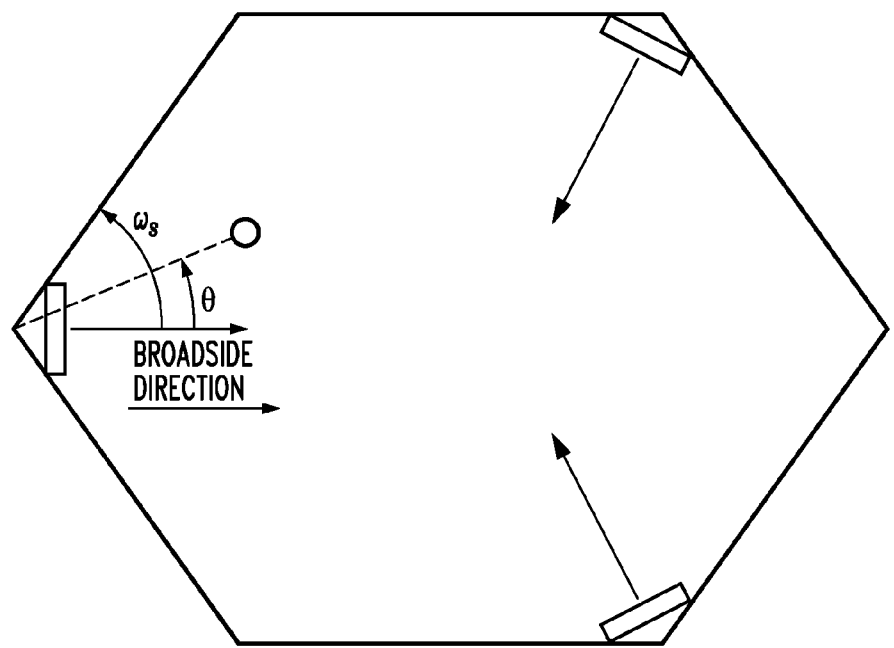
FIG. 6 is a diagram illustrating antenna orientation at a source of isolated coordination cluster according to an embodiment of the invention.
Figure 8:
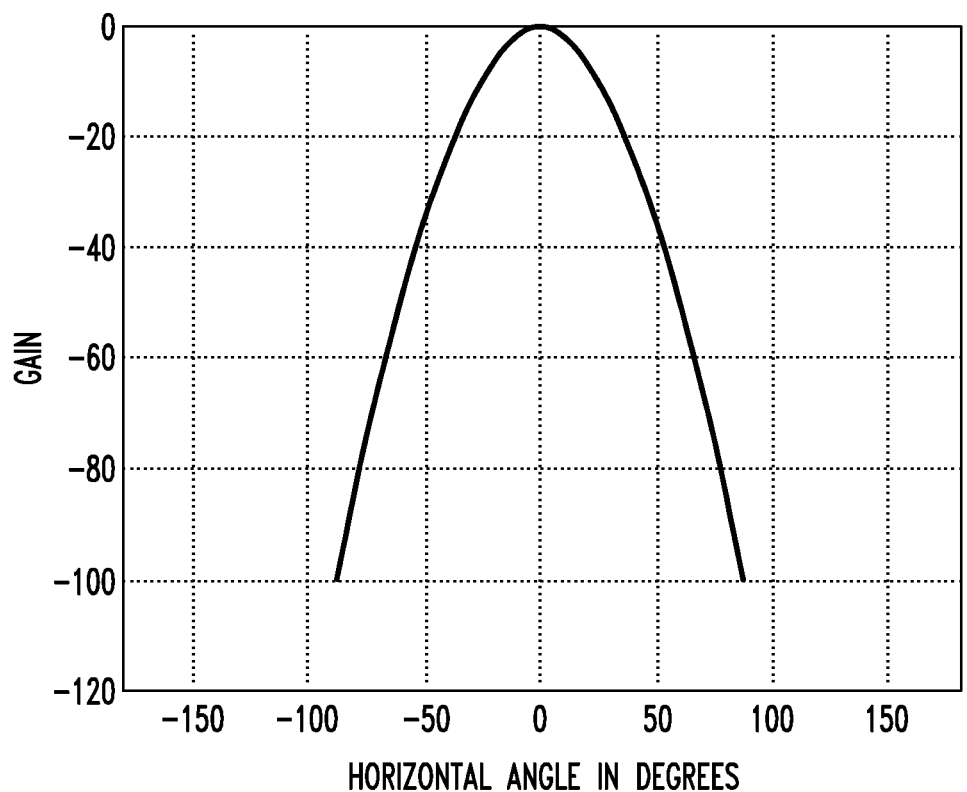
FIG. 8 is a diagram illustrating an antenna gain pattern according to an embodiment of the invention.

We assume at the $\mathcal{Q}=3$ sources, the following antenna gain pattern:

$$A(\theta) = -\min\left(12\left(\frac{\theta}{\theta_{3dB}}\right)^2, A_{max}\right) \quad (58)$$

where $A(\theta)$ is the antenna gain in dBi in the direction θ, with $-180 \leq \theta \leq 180$, $\theta_{3dB}$ is the 3 dB beamwidth and $A_{max}=20$ dB is the maximum attenuation. The antenna gain pattern is shown in FIG. 8. In the Monte-Carlo evaluations, we assume $\theta_{3dB}=70$. The orientation of the antennas is described in FIG. 6.

Figure 7:
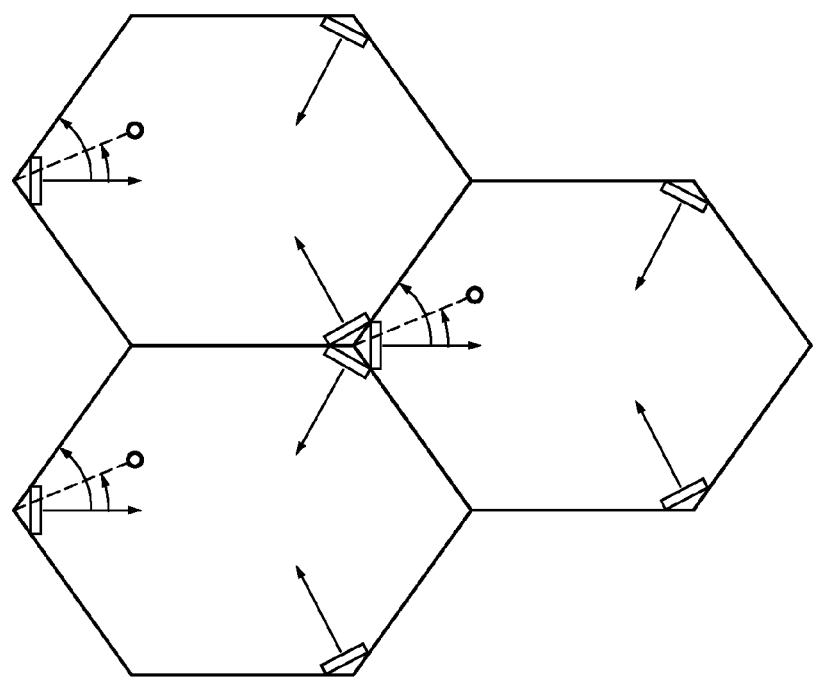
FIG. 7 is a diagram illustrating sector antenna orientation in a cellular network according to an embodiment of the invention.

The second scenario, that we analyze in section IV-B, is an interference network consisting of 19 of such coordination clusters with wrap around as in FIG. 4. This implies that the number of mutually interfering relay channels is 57. Such a system idealizes a cellular network composed of 19 base stations with three 120-degree sectors per base serving one user per sector at any one time and frequency resource. The sector antenna response is given as in equation (58) and the orientation is described in FIG. 7 where only three of the 19 adjacent coordination clusters, composing the entire cellular network in FIG. 4, are represented.

Recall that the computational complexity of the optimization algorithm proposed in section III-C grows exponentially with the number of interfering relay channels. To reduce complexity, we optimize the resource allocation only within each coordination cluster solving for each of the 19 coordination cluster the optimization problem given in equation (22) with $\mathcal{Q}=3$, $R'_l$ and $\hat{R}_l$ defined as in equations (26) and (27) and finally setting $P_S(l,n)=P$ and $P_R(l,n)=P$ whenever transmission is taking place. While the optimization is performed ignoring interference from other hexagons, the achievable rates are then computed taking full account of it.

For each of the two systems that we focus on, we consider two different cost functions for the optimization problem given in equation (22):

The throughput (per hexagon):

$$\mathcal{G}(R_1, \ldots, R_{\mathcal{Q}}) = \sum_{l=1}^{\mathcal{Q}} R_l, \quad (59)$$

The minimum rate (per hexagon) i.e.

$$\mathcal{G}(R_1, \ldots, R_{\mathcal{Q}}) = \min\{R_1, \ldots, R_{\mathcal{Q}}\}, \quad (60)$$

and for each of the aforementioned cost functions, given a realization of the random vector $\Xi$: (1) we find the optimum $\alpha^*$ that solves the optimization problem given in equation (22) when for all $n=1, \ldots, 2\mathcal{Q}$ and $l=1, \ldots, \mathcal{Q}$ the inequality constraints $P_S(l,n) \leq P$ and $P_R(l,n) \leq P$ are set as equality; (2) we evaluate the rates $R_l$ with $l=1, \ldots, \mathcal{Q}$ resulting from the optimum $\alpha^*$ which are random variables with a distribution induced by the random vector $\Xi$; (3) we evaluate the performance of the mutually interfering one-relay channels in terms of:

the cumulative distribution function (CDF) of the rates of the individual destinations, which can be defined as the CDF of the rate of any user (for example user 1):

$$\mathbb{P}\{R_l(\Xi) \leq x\} \quad (61)$$

the CDF of the throughput per hexagon defined as:

$$\mathbb{P}\left\{\sum_{l=1}^{\mathcal{Q}} R_l(\Xi) \leq x\right\} \quad (62)$$

the CDF of the minimum rate in the cluster:

$$\mathbb{P}\{\min_{l \in \{1,\ldots \mathcal{Q}\}} R_l(\Xi) \leq x\}. \quad (63)$$

In all scenarios that we consider, for all j,k,l taking values in $j \in \{S,R\}$, $k \in \{R,D\}$ and $l \in \{1, \ldots, \mathcal{Q}\}$, we generate the channel coefficients $h_{jk,l}$ of each one-relay channel, according to:

$$h_{jk,l} = \xi_{jk,l} \sqrt{\phi_{jk,l} \psi_{jk,l}} \quad (64)$$

where $\xi_{jk}$ is the fast fading coefficient, $\psi_{jk}$ models the shadowing term and $\phi_{jk}$ denotes the path-loss between the j-th transmitting node (source or relay) and the k-th receiving node (relay or destination).

Analogously, for all j, k, l taking values in $j \in \{S,R\}$, $k \in \{R,D\}$ and $i,l \in \{1, \ldots, \mathcal{Q}\}$ we generate the fading coefficients $\gamma_{j,i}^{k,l}$ of the crossing interfering links, according to:

$$\gamma_{j,i}^{k,l} = \xi_{j,i}^{k,l} \sqrt{\phi_{j,i}^{k,l} \psi_{j,i}^{k,l}} \quad (65)$$

where, as before, $\xi_{j,i}^{k,l}$ is the fast fading coefficient, $\psi_{j,i}^{k,l}$ models the shadowing term and $\phi_{j,i}^{k,l}$ denotes path-loss between the j-th transmitting node (source or relay) of the i-th one-relay channel and the k-th receiving node (relay or destination) for the l-th one-relay channel.

In all the Monte-Carlo evaluations, described in the subsequent sections, we assume that the standard deviation of the shadowing components, defined according to equations (64) and (65), are 8 dB for the links Source $\Rightarrow$ Destination and Relays $\Rightarrow$ Destination while instead we assume 6 dB for the link Source $\Rightarrow$ Relay.

Finally, for all the path-loss, $\phi_{j,i}^{k,l}$ is simulated according to the COST 231 model for a small to medium-sized city, and its values in dB is given by:

$$(\phi_{j,i}^{k,l})_{dB} = 46.3 + 33.9 \log_{10}(f_c) - 13.82 \log_{10}(L_j) - a(L_k) + (44.9 - 6.55 \log_{10}(L_j)) \log_{10}(d_{j,i}^{k,l}) \quad (66)$$

where $f_c$ is the carrier frequency in MHz, $d_{j,i}^{k,l}$ is distance between the j-th transmitting node of the i-th relay channel and the k-th receiving node of the l-th relay channel in km; $L_j$ and $L_k$ are the transmitter (Source or Relay) antenna height and the receiver (Relay or Destination) antenna height above the ground level in meters, respectively. a(x) is a correction factor for the receiver antenna height based on the size of the coverage area, given by:

$$a(x) = (1.1 \log_{10}(f_c) - 0.7)x - (1.56 \log_{10}(f_c) - 0.8).$$

In our simulation, we assume the antenna height equal to $L_S=25$ m for the Source, $L_R=15$ m for the Relays, $L_D=2$ m for the Destination. We also assume $f_c=2$ GHz, and a bandwidth of 10 MHz.

A. Isolated Coordination Cluster

In the isolated coordination cluster which we assume is a hexagon, as illustrated in FIG. 3, three sources are placed alternatively in the three corners of a hexagon with radius $R_{hex}=500$ m, the relays are placed in the middles of ideal lines between the source and the center of such hexagon, and finally the users are generated uniformly inside the coordination cluster. We assume that the power constraint P is such that:

$$\left(\frac{P}{N}\right)_{dB} = SNR_{ref} - (\phi_{ref})_{dB} \quad (67)$$

where $(N)_{dB} = -174 + N_f + 10 \log_{10}(BW)$ is the noise power with $N_f=10$ the noise figure in dB (here we are assuming the zero-mean complex Gaussian random variables modeling the additive Gaussian noise have variance equal to N), $SNR_{ref}=25$ dB, while:

$$(\phi_{ref})_{dB} = 46.3 + 33.9 \log_{10}(f_c) - 13.82 \log_{10}(L_S) - a(L_D) + (44.9 - 6.55 \log_{10}(L_S)) \log_{10}(R_{hex}) \quad (68)$$

In all the Monte-Carlo evaluations, for the isolated coordination cluster case, we associate each user to a source using the following association policy: after that the user is dropped in random location in the isolated coordination cluster with the $\mathcal{Q}=3$ sources, using uniform distribution, the user is assigned to the source received with the highest average signal-to-interference-to-noise ratio (SINR), accounting for distance-based pathloss and shadowing and evaluated assuming that all sources transmit with full power P as given in equation (67).

1) IC Algorithm Based on Max-Min-Rate Policy and No-Power-Optimization

Figure 9:
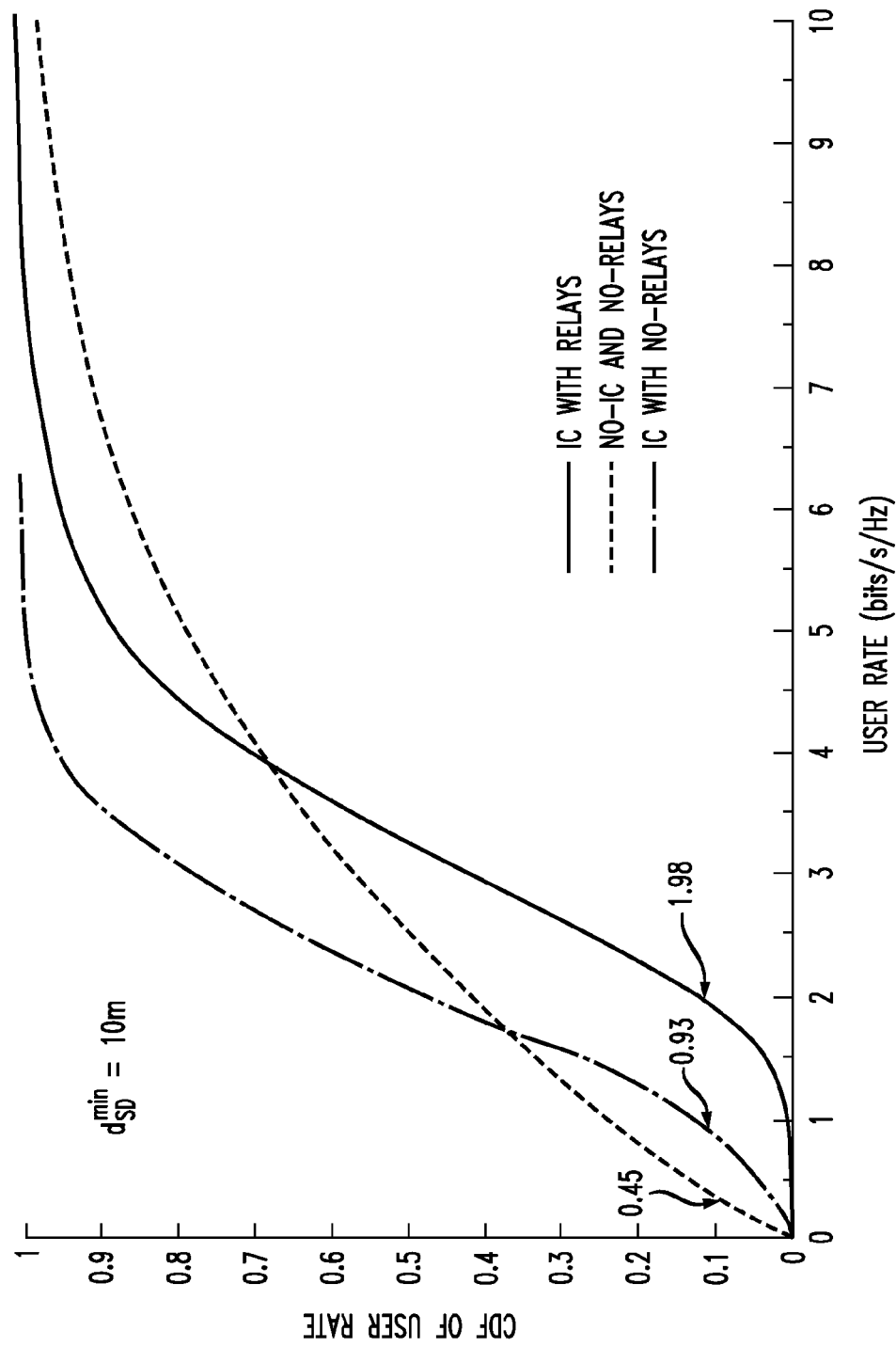
FIGS. 9-16 are diagrams illustrating cumulative distribution functions according to embodiments of the invention.
Figure 10:
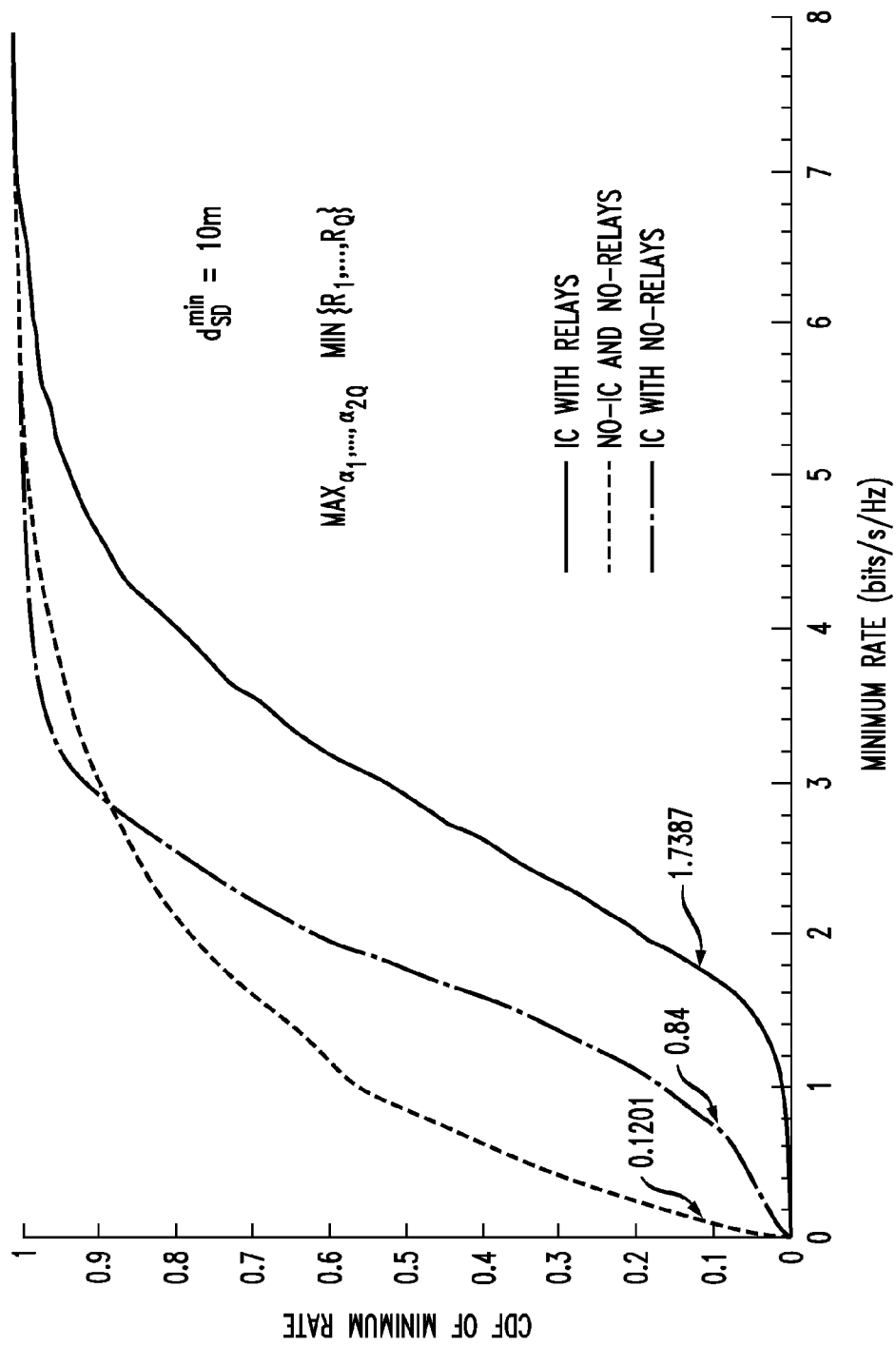
Figure 11:
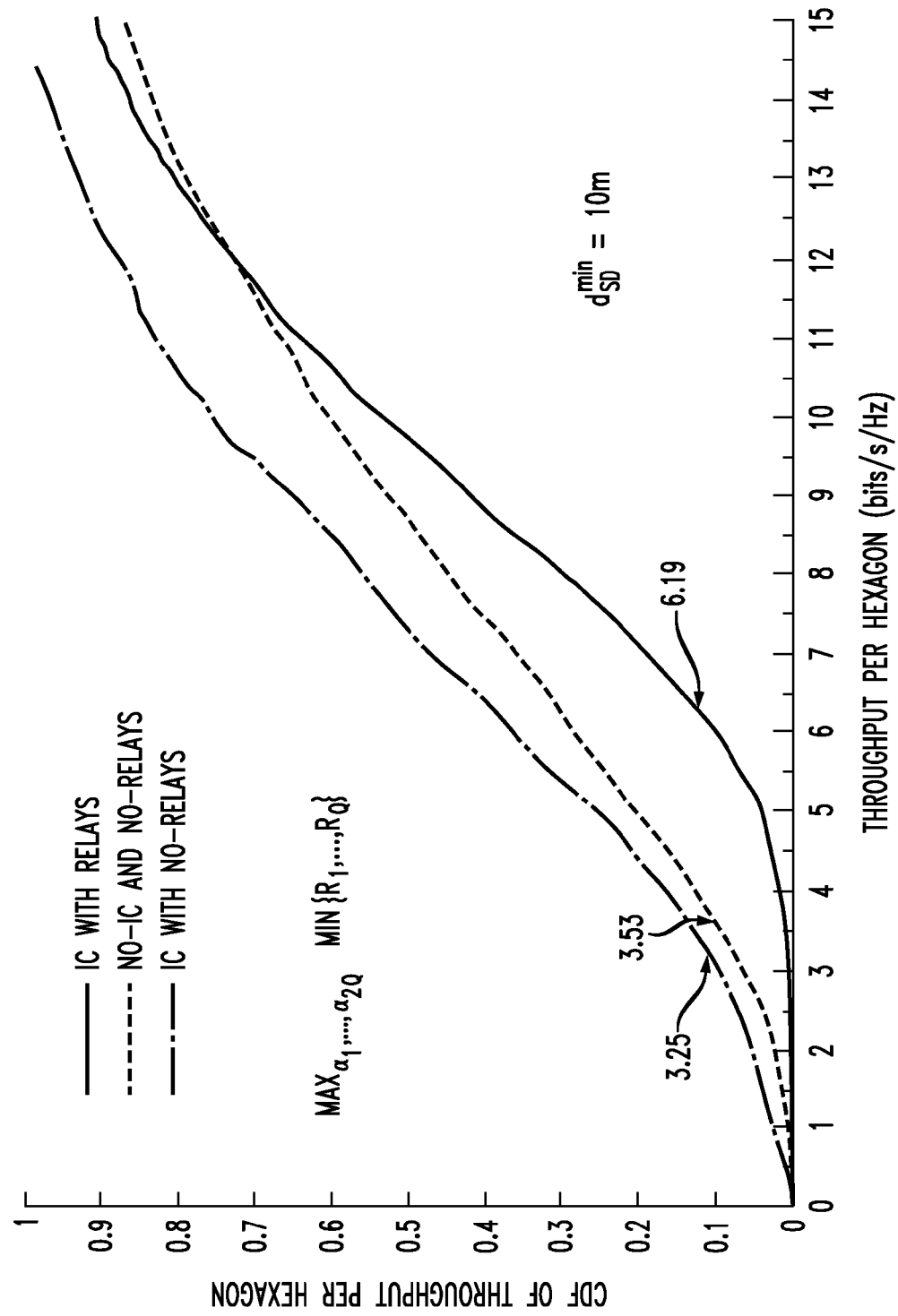

This subsection and FIGS. 9, 10 and 11 illustrate the performances of the isolated coordination cluster where the vector $\alpha = [\alpha_1, \ldots, \alpha_{2\mathcal{Q}}]$, is optimized, for $\mathcal{Q}=3$, assuming as cost function the max-min-rate policy. This implies that a adopted in the transmission scheme is the solution of the following optimization problem:

$$\max_{\alpha \in \mathcal{V}} \min\{R_1, \ldots, R_\mathcal{Q}\} \quad (69)$$

subject to $$\begin{cases} R_l = \min\{R'_l, \hat{R}_l\} & l = 1, \ldots \mathcal{Q} \\ \sum v_i(\alpha) = 1 & \\ P_S(l, n) = \begin{cases} P & \text{if } 1 \le n \le \sigma^{-1}(l+\mathcal{Q}) \\ 0 & \text{otherwise} \end{cases} & \\ P_R(l, n) = \begin{cases} P & \text{if } \sigma^{-1}(l) \le n \le \sigma^{-1}(l+\mathcal{Q}) \\ 0 & \text{otherwise} \end{cases} & l = 1, \ldots \mathcal{Q}, \\ & n = 1, \ldots 2\mathcal{Q} \end{cases}$$

with $\mathcal{V}$ defined as in equation (23), $R'_l$, and $\hat{R}_l$ defined as in equations (26) and (27). Recall that the search for the optimal value of $\alpha$ is on all possible vectors $\alpha$ with non negative elements such that $0 \le \alpha_i < 1$ and $\alpha_i \le \alpha_{i+\mathcal{Q}} \le 1$ for all $i=1, \ldots, \mathcal{Q}$.

In order to better quantify the gain obtained due to the presence of the relays, for comparison purposes, we give the performance of the same isolated coordination cluster for two different scenarios where relays are not exploited. In the first scenario, we assume that $P_R(.,.)=0$ while the value of $\alpha$, which dictates the employed IC scheme, is obtained by solving the optimization problem given in equation (69) without assuming assisted relay communications. This implies that in equation (69), we set $P_R(l,n)=0$ for all $n=1, \ldots, 2\mathcal{Q}$ and $l=1, \ldots, \mathcal{Q}$ and we solve the following optimization problem:

$$\max_{\alpha \in \mathcal{V}} \min\{R_1, \ldots, R_\mathcal{Q}\} \quad (70)$$

subject to $$\begin{cases} R_l = \min\{R'_l, \hat{R}_l\} & l = 1, \ldots \mathcal{Q}, \\ \sum v_i(\alpha) = 1 & \\ P_R(l, n) = 0 & l = 1, \ldots \mathcal{Q}, \\ & n = 1, \ldots, 2\mathcal{Q} \\ P_S(l, n) = \begin{cases} P & \text{if } 1 \le n \le \sigma^{-1}(l+\mathcal{Q}) \\ 0 & \text{otherwise} \end{cases} & l = 1, \ldots \mathcal{Q}, \\ & n = 1, \ldots 2\mathcal{Q} \end{cases}$$

Again, the search for the optimal value of $\alpha$ is on all possible vectors $\alpha$ with non negative elements such that $0 \le \alpha_i < 1$ and $\alpha_i \le \alpha_{i+\mathcal{Q}} \le 1$ for all $i=1, \ldots, \mathcal{Q}$.

The second scenario is when no relays and no IC scheme are employed. Specifically, we adopt the so-called universal reuse (i.e., all the sources transmit at full power all the time).

Specifically, FIGS. 9 and 11 illustrate, respectively, the CDF of the individual user rates, as defined by equation (61), and the CDF of the throughput per hexagon, as defined in equation (63):
- solid line: when an interfering relay-channel, composed of $\mathcal{Q} = 3$ mutually interfering one-relay channels, as in FIG. 3, is considered, and $\alpha$ is optimized based on the max-min-rate policy as in equation (69);
- dotted line: when the $\mathcal{Q} = 3$ sources are still placed at the corner of the hexagon as in FIG. 3 but no relays are employed thus the $\alpha$ is still optimized based on the max-min-rate policy as in equation (69) but with the additional constraint that $P_R(.,.)=0$;
- dashed line: when the $\mathcal{Q} = 3$ sources are still placed at the corner of the hexagon as in FIG. 3 and no relays and no IC scheme are employed.

We find that, in the case of an isolated coordination cluster, the proposed transmission policy dictated by $\alpha^*$ results (note that analysis result values are intended to be approximate):
- in an average user rate of 3.6 bps/Hz when IC and relays are employed as compared to 3.9 bps/Hz for the same coordination cluster when no IC and no relays are employed and to 2.6 bps/Hz when IC and no relays are employed.
- in edge rates (10% outage) of 1.98 bps/Hz when IC and relays are employed as opposed to 0.45 bps/Hz with no IC and no relays and to 0.93 bps/Hz when IC and no relays are employed.
- in a 10%-tile throughput of 6.19 bps/Hz when IC and relays are employed as opposed to 3.53 bps/Hz with no IC and no relays and to 3.25 bps/Hz when IC and no relays are employed.

Notice that the lower value of the average rate when IC and no relay are employed compared with the universal reuse is justified in view of the fairness constraint that the resource-allocation optimization problem in equation (70) imposes. However, such fairness constraint translates in a higher edge rate as opposed to the no-IC and no-relay case. Analogous considerations hold for the scenario when IC and relay are employed. However, in this case, the presence of the relays allows to impose the fairness constraints with almost no reduction in the average rate and significant improvement in the edge rate.

2) IC Algorithm Based on Max-Sum-Rate policy and No-Power-Optimization

Figure 12:
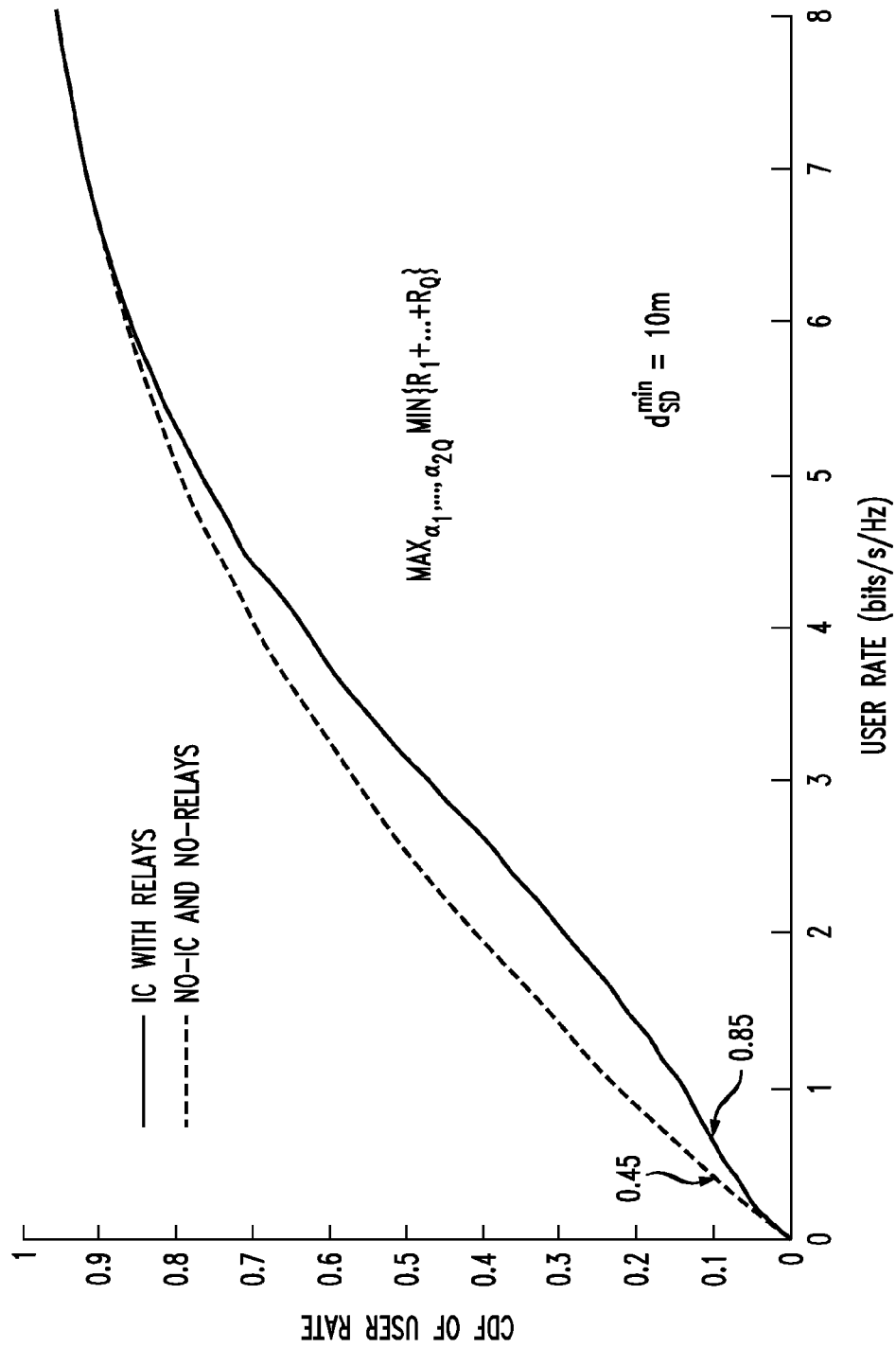
Figure 13:
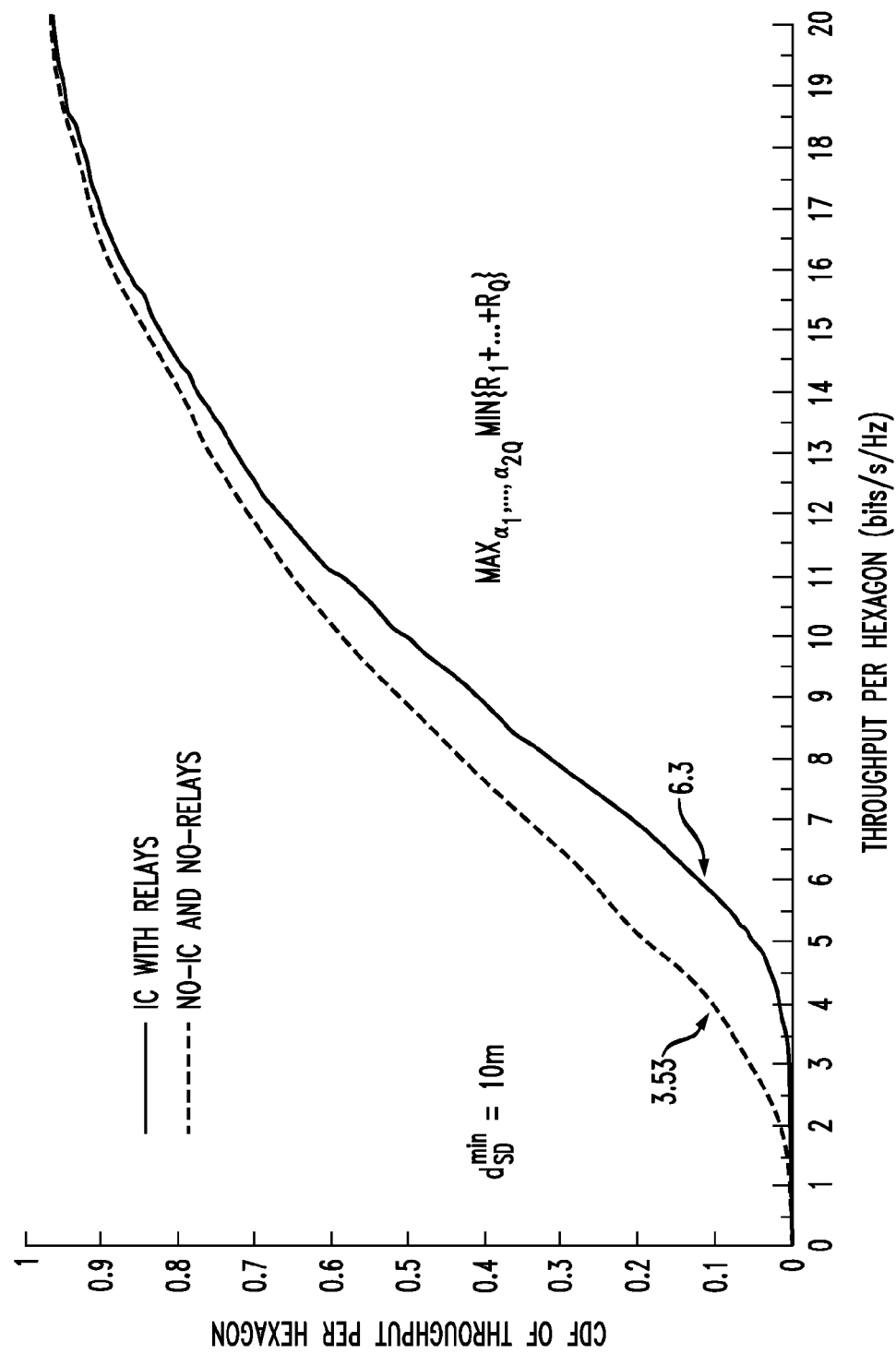

This subsection and FIGS. 12 and 13 illustrate the performances of the isolated coordination cluster where the vector $\alpha = [\alpha_1, \ldots, \alpha_{2\mathcal{Q}}]$, with $\mathcal{Q} = 3$, is optimized assuming as cost function the max-sum-rate policy. This implies that $\alpha$ adopted in the transmission scheme is the solution of the following optimization problem:

$$\max_{\alpha \in [0,1]^{2\mathcal{Q}}} \sum_l R_l \quad (71)$$

subject to $$\begin{cases} R_l = \min\{R'_l, \hat{R}_l\}, & l = 1, \ldots \mathcal{Q} \\ \alpha_{l+\mathcal{Q}} = 1, & l = 1, \ldots \mathcal{Q} \\ \sum v_i(\alpha) = 1, & \\ P_S(l, n) = \begin{cases} P & \text{if } 1 \le n \le \sigma^{-1}(l+\mathcal{Q}) \\ 0 & \text{otherwise}, \end{cases} & l = 1, \ldots \mathcal{Q}, \\ & n = 1, \ldots 2\mathcal{Q} \\ P_R(l, n) = \begin{cases} P & \text{if } \sigma^{-1}(l) \le n \le \sigma^{-1}(l+\mathcal{Q}) \\ 0 & \text{otherwise}, \end{cases} & l = 1, \ldots \mathcal{Q}, \\ & n = 1, \ldots 2\mathcal{Q} \end{cases}$$

with $\mathcal{V}$ defined as in equation (23), $R'_l$, and $\hat{R}_l$ defined as in equations (26) and (27). This implies that there are no users in the coordination cluster that terminate their reception of information before than others. For comparison purposes, we give the performance of the same isolated coordination cluster when no relays and no IC are employed (i.e., the so-called universal reuse). This is equivalent to setting $P_R(l,n)=0$ and $P_R(l,n)=P$ for all $l=1, \ldots, \mathcal{Q}$ and $n=1, \ldots, 2\mathcal{Q}$.

We find that, in the case of an isolated coordination cluster, the proposed transmission policy dictated by $\alpha^*$, optimized based on max-sum-rate policy, results in:
- in an average user rate of 4.2 bps/Hz, when IC and relays are employed, as compared to 3.90 bps/Hz for the case of no IC and no relays;

in edge rates (10% outage) of 0.85 bps/Hz as opposed to 0.45 bps/Hz when no IC and no relays are employed.

in a 10%-tile throughput of 6.3 bps/Hz as opposed to 3.53 bps/Hz with no relays.

Note that, in this scenario, the resource-allocation optimization problem defined in equation (71) does not impose any fairness constraint. Consequently, the relay-assisted scheme can take advantage of the presence of the relays in both average and edge rate. Hence, we no longer observe a reduction of the average rate which instead, in this scenario, slightly improves with respect to the universal reuse. Furthermore, we experience a significative higher edge rate due to the presence of the relays.

B. Full Network

The objective of this subsection is to evaluate the benefit of the proposed strategy, in the context of a cellular network. Towards to this end, we simulate the downlink scenario of a network with 19 idealized hexagonal cells each having a base station at the center of each cell (see FIG. 4), with 3 sectors per base serving one user per sector at any one time and frequency resource. For simplicity, we consider only one tone per slot which can be seen as a single time-frequency tile in a OFDMA system, as in LTE. As already illustrated at the beginning of section IV, such a cellular network can also be described as the union of 19 coordination clusters. As in subsection IV-A, we assume that the relays are placed in the middles of ideal lines between the source and the center of cluster. In all numerical results, we assume that the users are generated uniformly over the entire network and associated to one of the 57 sectors characterized by the highest received average signal-to-interference-to-noise ratio (SINR), which is computed: (1) accounting for distance-based path loss and shadowing, and (2) assuming that all sources transmit with full power P as given in equation (67). Notice that, in this assignment policy, we do not take into account the presence of the relays. Performance could improve by accounting for the presence of relays in the association policy. In fact, notice that differently from the case described in subsection IV-A, where the users were placed geographically inside the coordination cluster, in this full network case, given the aforementioned source/user association, a source and its associated user could be located geographically in different hexagons and consequently the user could be geographically located outside its coordination cluster.

For all the plots, we assume the radius of the hexagons composing the entire network equals $R_{hex}=1000$ m and we set the power constraint as in equation (67).

1) IC Algorithm Based on Max-Min-Rate policy and On-Off-Power-Optimization

Figure 14:
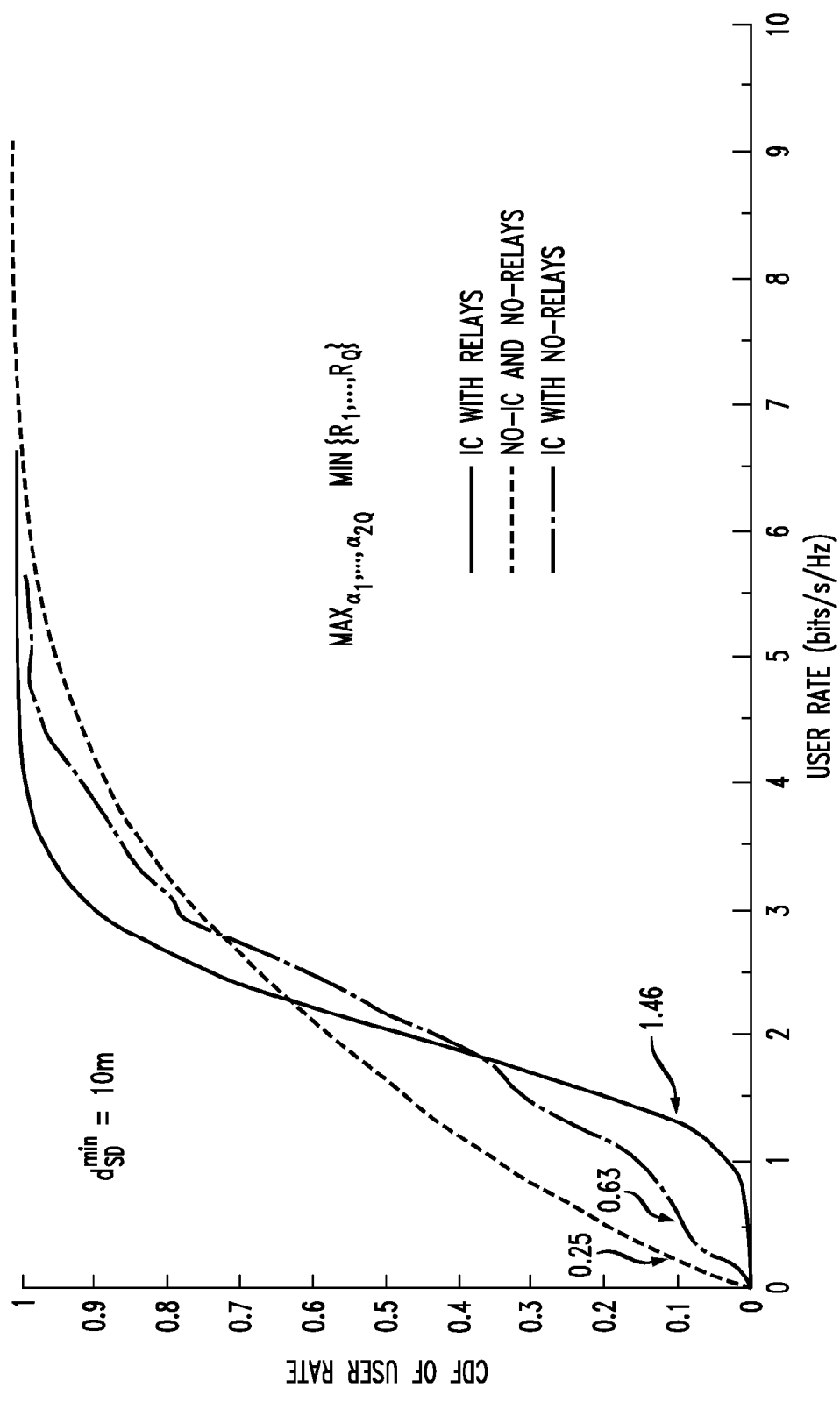
Figure 15:
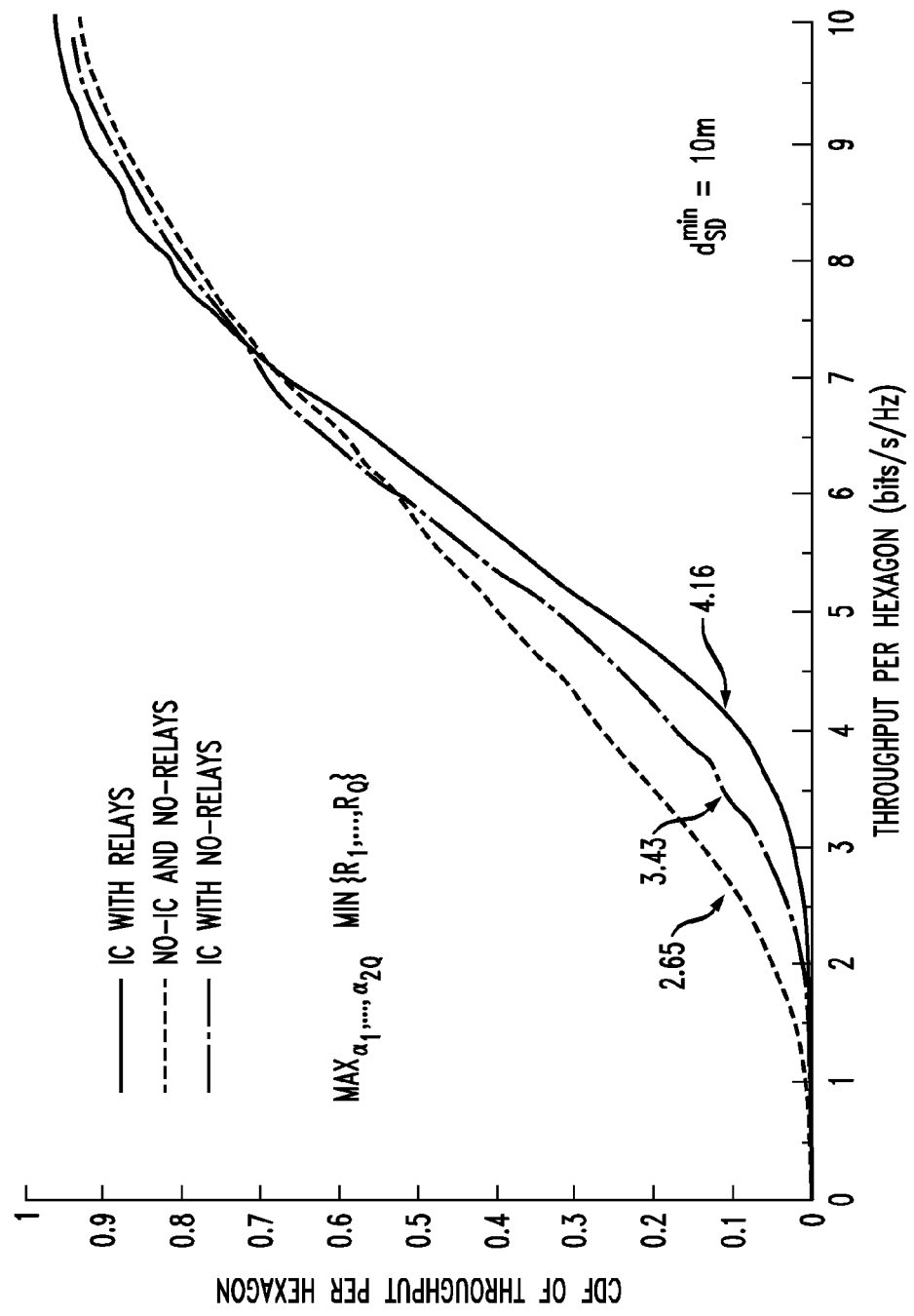

FIGS. 14 and 15 illustrate, respectively, the CDF of the individual user rates, as defined by equation (61), and the CDF of the throughput per hexagon, as defined in equation (63), of a relay assisted cellular network with 19 cells with wrap around, where, as illustrated at the beginning of section IV, the optimum vector $\alpha^*$ and the set of transmitting powers $P^*_S(.,.)\in\{0,P\}$ and $P^*_R(.,.)\square\{0,P\}$ are obtained based on max-min-rate policy and on-off-power-optimization. This is equivalent to saying that the optimum vector $\alpha^*$, $P^*_S(.,.)$, and $P^*_R(.,.)$ are obtained solving in each of the 19 coordination clusters separately, the following optimization problem:

$$\max_{\alpha \in \mathcal{V}} \min\{R_1, \ldots, R_3\} \qquad (72)$$

subject to $$\begin{cases} R_l = \min\{R'_l, \hat{R}_l\} & l=1,\ldots 3 \\ \sum v_i(\alpha) = 1 & \\ P_S(l,n) = \begin{cases} \{0,P\} & \text{if } 1 \le n \le \sigma^{-1}(l+3) \\ 0 & \text{otherwise} \end{cases} & \begin{matrix} l=1,\ldots,3, \\ n=1,\ldots 6 \end{matrix} \\ P_R(l,n) = \begin{cases} \{0,P\} & \text{if } \sigma^{-1}(l) \le n \le \sigma^{-1}(l+3) \\ 0 & \text{otherwise} \end{cases} & \begin{matrix} l=1,\ldots,3, \\ n=1,\ldots 6 \end{matrix} \end{cases}$$

with $$\mathcal{V} = \{\alpha \in [01]^6 : \alpha_i < \alpha_{i+Q}, i=1,\ldots,3\}, \qquad (73)$$

while $R'_l$ and $\hat{R}_l$ defined as in equation (26) and (27). Recall that the search for the optimal value of $\alpha$ is on all possible vectors $\alpha$ with non negative elements such that $0 \le \alpha_i < 1$ and $\alpha_i \le \alpha_{i+3} = 1$ for all $i=1,\ldots,3$.

The performance of such system is compared with the performance achieved by the same cellular network consisting of 19 cell wrapped around, when $P_R(.,.)=0$ while the value of $\alpha$ which dictates the employed IC-scheme, is optimized, in each hexagon separately, based on the max-min-rate policy as in equation (72), but without assuming assisted relay communications. This implies that in equation (72), we set $P_R(l,n)=0$ for all $n=1,\ldots,2Q$ and $l=1,\ldots,Q$ and we solve the following optimization problem:

$$\max_{\alpha \in \mathcal{V}} \min\{R_1, \ldots, R_3\} \qquad (74)$$

subject to $$\begin{cases} R_l = \min\{R'_l, \hat{R}_l\} & l=1,\ldots 3 \\ \sum v_i(\alpha) = 1 & \\ P_R(l,n) = 0 & \begin{matrix} l=1,\ldots,3, \\ n=1,\ldots 6 \end{matrix} \\ P_S(l,n) = \begin{cases} \{0,P\} & \text{if } 1 \le n \le \sigma^{-1}(l+3) \\ 0 & \text{otherwise} \end{cases} & \begin{matrix} l=1,\ldots,3, \\ n=1,\ldots 6 \end{matrix} \end{cases}$$

For comparison, we also give the performance achieved by the same cellular network consisting of 19 cell wrapped around, when no relays are employed and a classical reuse 3 is adopted in order to mitigate the interference.

Figure 16:
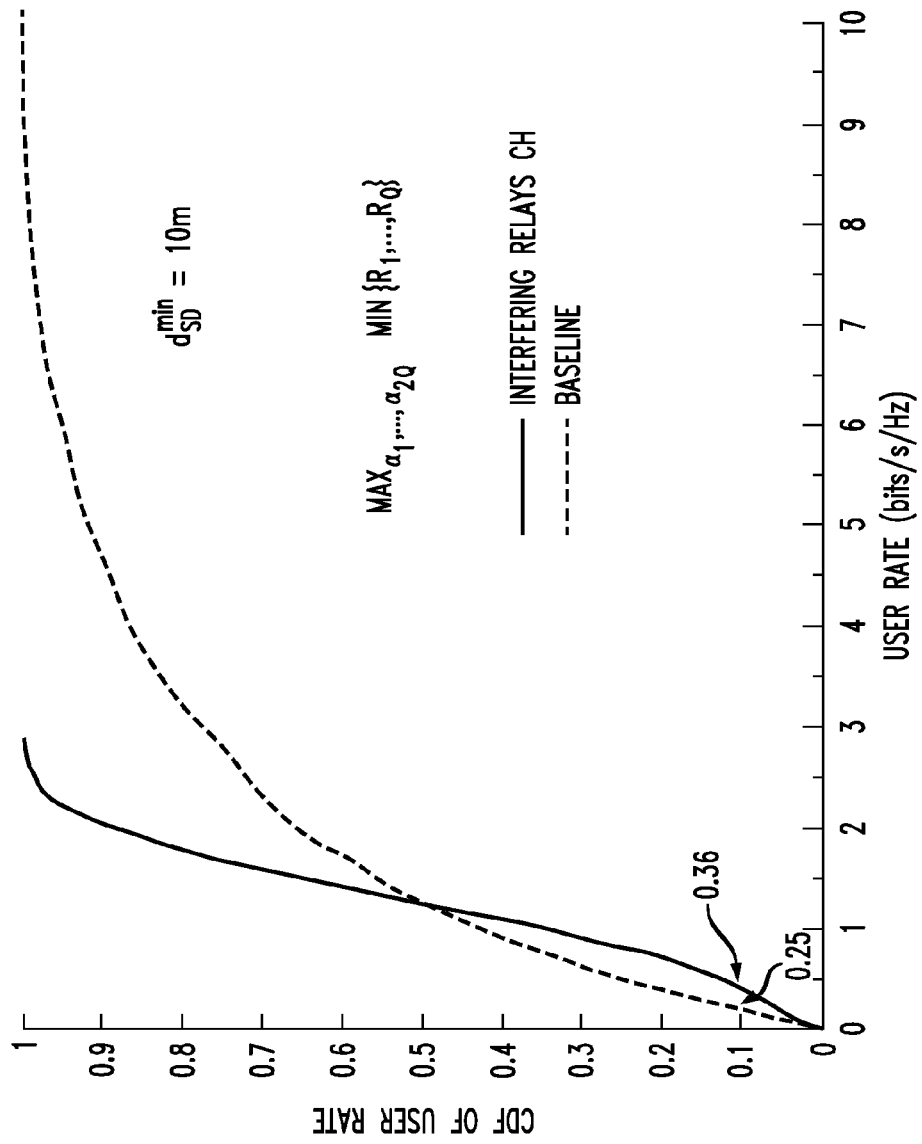

Furthermore, in order to illustrate the value of interference coordination or equivalently the value of joint optimizing, at least in each coordination cluster, the vector $\alpha$, FIG. 16 gives the performance, in terms of CDF of the user rate, of the cellular network, where no optimization of the vector $\alpha$ is performed inside each coordination cluster. This implies that each relay acts independently and optimizes its own $\alpha_i$ like any other relays were not there. As can be seen, clearly, coordination of relay transmissions is a key factor in realizing relay gains.

The numerical results show that this strategy is quite effective. It achieves:

2.2 bps/Hz in average user rate, as compared to 2.12 bps/Hz when IC and no relays are employed and as compared to 1.7 bps/Hz when no IC and no relays are employed but only the classical reuse 3 is used.

1.46 bps/Hz in edge rates (10% outage), as opposed to 0.65 bps/Hz when IC and no relays are employed and as opposed to 0.25 bps/Hz when no IC and no relays are employed but only the classical reuse 3 is used.

4.16 bps/Hz at 10%-tile throughput, as opposed to 3.43 bps/Hz when IC and no relays are employed and as opposed to 2.65 bps/Hz obtained when no IC and no relays are invoked but only reuse 3 is used.

Finally notice that if no coordination is employed between the relays in each hexagon, then: the achieved average user rate is 1.105 bps/Hz and the edge rates (10% outage), is 0.36 bps/Hz. This shows how coordination of relay transmissions is a key factor in realizing relay gains.

With reference to the numerical analysis results described above, the following is a further description of the aforementioned FIGS. 8-16, and how they were generated.

FIG. 8 shows an antenna gain pattern as a function of the horizontal angle in degrees. The mathematical expression for the gain is given in equation (58).

FIG. 9 is a CDF of the individual user rates as defined in equation (61). The solid line is when $\alpha$ is optimized based on equation (69). The dashed line is when no IC scheme and no relays are employed. The dotted line is when $\alpha$ is optimized based on equation (70).

FIG. 10 is a CDF of the Minimum Rate as defined in equation (62). The solid line is when $\alpha$ is optimized based on equation (69). The dashed line is when no IC scheme and no relays are employed. The dotted line is when $\alpha$ is optimized based on equation (70).

FIG. 11 is a CDF of the throughput per hexagon, as defined in equation (63). The solid line is when $\alpha$ is optimized based on equation (69). The dashed line is when no IC scheme and no relays are employed. The dotted line is when $\alpha$ is optimized based on equation (70).

FIG. 12 is a CDF of the individual user rate as defined in equation (61). The solid line is when $\alpha$ is optimized based on the max-sum-rate policy as in equation (71). The dashed line is when no IC scheme and no relays are employed.

FIG. 13 is a CDF of the throughput per hexagon of an interfering relay-channel with $\mathcal{Q}=3$ one-relay channels. The solid line is when $\alpha$ is optimized based on the max-sum-rate policy as in equation (71). The dashed line is when no IC scheme and no relays are employed.

FIG. 14 is a CDF of the user rate in a cellular network with 19 cell wrapped around. The solid line is when $\alpha$ is optimized, in each hexagon separately, based on equation (72). The dashed line is when no IC scheme and no relays are employed. The dotted line is when $\alpha$ is optimized based on equation (74).

FIG. 15 is a CDF of the throughput per hexagon in a cellular network with 19 cell wrapped around. The solid line is when $\alpha$ is optimized, in each hexagon separately, based on equation (72). The dashed line is when no IC scheme and no relays are employed. The dotted line is when $\alpha$ is still optimized, in each hexagon separately, based on the max-min-rate policy as in equation (69) but with the additional constraint that $P_R(.,.)=0$.

FIG. 16 is a CDF of the user rate in a cellular network with 19 cell wrapped around, where the $\alpha$'s are not jointly optimized inside each hexagon.

Accordingly, as illustratively explained above, we have focused on half-duplex relaying strategies in an interference-limited cellular system. We concentrated on the downlink scenario but similar techniques can be applied to the uplink. We proposed an optimization scheme for the resource allocation (time and power) that captures in the set of the possible transmission-protocol solutions for the optimization scheme, several of the most popular and common transmission protocols for interference coordination (IC). At the same time, the proposed method admits new transmission-protocol solutions much more flexible and general than previous IC methods. We focused on a specific half-duplex relaying strategy. For such a setup, we found the optimal resource allocation (time and power) in the sense of maximizing a given cost function of the achievable rates. In spite of the non-convex nature of such problems, we proved that the optimal solution can be obtained via a branch and bound dual decomposition algorithm, with in an epsilon-precision with a finite number of steps (which does not hold for general non-convex problems). In section III-C, we proposed an implementation of the branch and bound dual decomposition algorithm based on Lagrange bounds.

To evaluate the performance in a cellular network without incurring unacceptable computational complexity, we considered autonomous coordination clusters, each of which finds the resource allocation that optimizes a given cost function, such as throughput, minimum rate or weighted sum rate (equations (19) through (21)), ignoring out of cluster interference. Of course choosing such a modus operandi is suboptimal. However, numerical results showed that in the presence of relays the IC strategy, solution of the optimization scheme, is quite effective in achieving 1.46, and 4.16 bps/Hz in edge rate, and throughput at 10%-tile, as compared to 0.25, and 2.65 for the case of no relays and no IC. However, using only the IC scheme with no relay still brings significant gains. Specifically, the proposed IC scheme with no relays is capable of achieving 0.63 bps/Hz at the edge rate, and 3.43 bps/Hz throughput at 10%-tile.

V. Illustrative Computing System

One or more embodiments of the methodologies described herein above can be implemented via software code running on a general purpose computer or workstation. That is, the interference coordination system 16 of FIG. 1, which implements the methodologies described above in the context of FIGS. 2-16, can be implemented in one or more computer systems.

Figure 17:
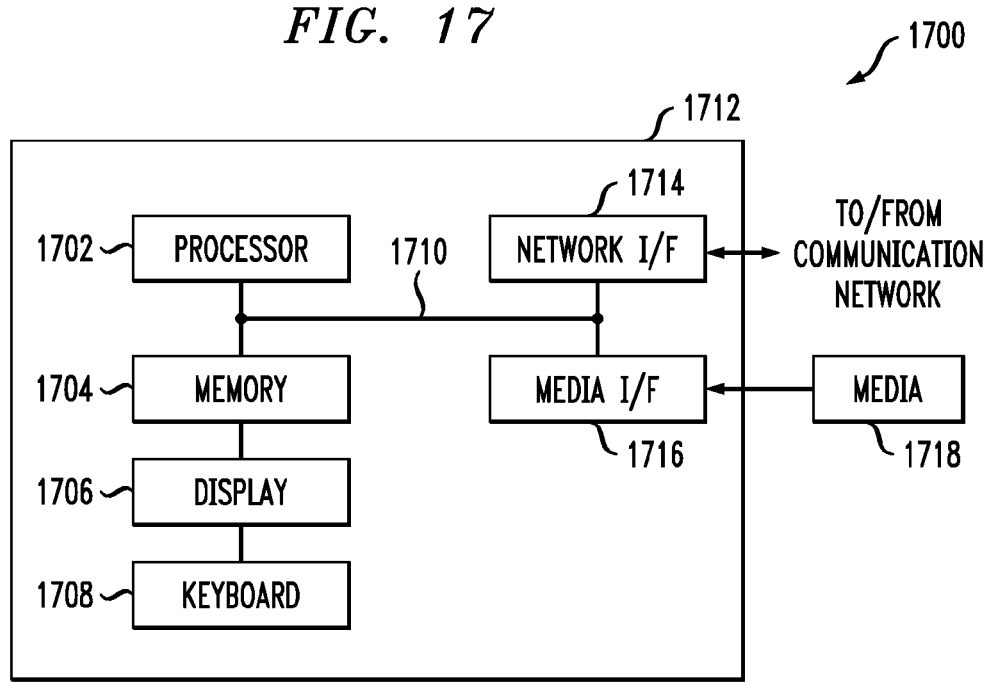
FIG. 17 is a block diagram illustrating generalized hardware architecture of a data network and communication devices suitable for implementing one or more of the protocols according to embodiments of the invention.

With reference to FIG. 17, such a computer system implementation 1700 employs, for example, a processor 1702, a memory 1704, and an input/output interface formed, for example, by a display 1706 and a keyboard 1708. The term "processor" as used herein is intended to include any processing device, such as, for example, one that includes a CPU (central processing unit) and/or other forms of processing circuitry. Further, the term "processor" may refer to more than one individual processor device. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer).

The processor 1702, memory 1704, and input/output interface such as display 1706 and keyboard 1708 can be interconnected, for example, via bus 1710 as part of a data processing unit 1712. Suitable interconnections, for example, via bus 1710, can also be provided to a network interface 1714, such as a network card, which can be provided to interface with a communication network (e.g., cellular network 10 in FIG. 1), and to a media interface 1716, such as a diskette or CD-ROM drive, which can be provided to interface with media 1718.

A data processing system suitable for storing and/or executing program code can include at least one processor 1702 coupled directly or indirectly to memory elements 1704 through a system bus 1710. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 1708 for making data entries; display 1706 for viewing data; pointing device for selecting data; and the like) can be coupled to the system either directly (such as via bus 1710) or through intervening I/O controllers (omitted for clarity).

Network adapters such as network interface 1714 may also be coupled to the system to enable the data processing system to become coupled to other data processing systems or remote printers or storage devices through intervening private or public networks. Modems, cable modem and Ethernet cards are just a few of the currently available types of network adapters.

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device. That is, a computer readable storage medium stores processor device executable instructions which, when executed by a processor device, perform one or more steps of the inventive methodologies described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
obtaining input information from a communication network, the input information comprising existing power levels associated with transmitting nodes in the communication network, and existing channel information associated with receiving nodes in the communication network; and
evaluating a cost function for a given range of interference values based on at least a portion of the input information to determine a coordinated resources set that reduces interference in the communication network, the coordinated resources set comprising future transmitting times and future power levels associated with the transmitting nodes and future decoding times associated with the receiving nodes.

2. The method of claim 1, further comprising causing an implementation of the coordinated resource set in the communication network.

3. The method of claim 1, wherein the transmitting nodes comprise base stations in the communication network.

4. The method of claim 3, wherein one or more of the transmitting nodes and the receiving nodes comprise relays in the communication network.

5. The method of claim 1, wherein the receiving nodes comprise user equipment in the communication network.

6. The method of claim 1, wherein the coordinated resource set determining step further comprises evaluating the range of interference values with respect to the receiving nodes and splitting the range up into two or more subsets.

7. The method of claim 1, wherein the coordinated resource set of future transmitting times and future power levels associated with the transmitting nodes and future decoding times associated with the receiving nodes that reduce interference in the communication network is determined for a downlink.

8. The method of claim 1, wherein the coordinated resource set of future transmitting times and future power levels associated with the transmitting nodes and future decoding times associated with the receiving nodes that reduce interference in the communication network is determined for an uplink.

9. An apparatus comprising:
a memory; and
a processor device operatively coupled to the memory and configured to:
obtain input information from a communication network, the input information comprising existing power levels associated with transmitting nodes in the communication network, and existing channel information associated with receiving nodes in the communication network; and
evaluate a cost function for a given range of interference values based on at least a portion of the input information to determine a coordinated resources set that reduces interference in the communication network, the coordinated resources set comprising future transmitting times and future power levels associated with the transmitting nodes and future decoding times associated with the receiving nodes.

10. The apparatus of claim 9, wherein the processor device is further configured to cause an implementation of the coordinated resource set in the communication network.

11. The apparatus of claim 9, wherein the transmitting nodes comprise base stations in the communication network, and the receiving nodes comprise user equipment in the communication network.

12. The apparatus of claim 11, wherein one or more of the transmitting nodes and the receiving nodes comprise relays in the communication network.

13. An article of manufacture comprising:
a non-transitory computer readable storage medium for storing processor device executable instructions which when executed by a processor device:
obtain input information from a communication network, the input information comprising existing power levels associated with transmitting nodes in the communication network, and existing channel information associated with receiving nodes in the communication network; and evaluate a cost function for a given range of interference values based on at least a portion of the input information to determine a coordinated resources set that reduces interference in the communication network, the coordinated resources set comprising future transmitting times and future power levels associated with the transmitting nodes and future decoding times associated with the receiving nodes.

14. A method comprising:

obtaining input information from a communication network, the input information comprising existing power levels associated with transmitting nodes in the communication network, and existing channel information associated with receiving nodes in the communication network; and determining a coordinated resource set of future transmitting times and future power levels associated with the transmitting nodes and future decoding times associated with the receiving nodes that reduce interference in the communication network, the coordinated resource set determination comprising evaluating a cost function for a given range of interference values based on at least a portion of the input information;

wherein the coordinated resource set determining step further comprises evaluating the range of interference values with respect to the receiving nodes and splitting the range up into two or more subsets, and performing a bounding process by evaluating, for each of the two or more subsets into which the range is split, an upper bound and a lower bound of the cost function.

15. The method of claim 14, wherein, for the bounding process, the upper bound and the lower bound of the cost function are evaluated in terms of the power levels, the transmitting times, and the decoding times.

16. The method of claim 14, wherein the coordinated resource set determining step further comprises performing a branching process by selecting the subset of the two or more subsets with a minimum value for the lower bound.

17. The method of claim 16, wherein, for the branching process, the selected subset is split into two or more further subsets based on a given subdivision rule.

18. The method of claim 16, wherein the coordinated resource set determining step further comprises determining whether or not a difference between the upper bound and the lower bound is smaller than a given precision measure.

19. The method of claim 18, wherein the power levels, the transmitting times, and the decoding times associated with the selected subset are identified as the coordinated resource set of future transmitting times and future power levels associated with the transmitting nodes and future decoding times associated with the receiving nodes that reduce interference in the communication network, when the difference between the upper bound and the lower bound is determined to be smaller than the given precision measure.

20. The method of claim 18, wherein when the difference between the upper bound and the lower bound is determined not to be smaller than the given precision measure, the bounding process and branching process are repeated for a new set of interference values, transmitting times and decoding times.

21. An apparatus comprising a memory and processor device operatively coupled to the memory and configured to perform the steps of claim 14.

22. An article of manufacture comprising a non-transitory computer readable storage medium for storing processor device executable instructions which when executed by a processor device perform the steps of claim 14.

* * * * *